(12) United States Patent
Senkfor et al.

(10) Patent No.: US 8,623,989 B1
(45) Date of Patent: *Jan. 7, 2014

(54) POLYUREA/POLYTHIOUREA COATINGS

(75) Inventors: Howard Senkfor, South Euclid, OH (US); Thomas R. Hockswender, Gibsonia, PA (US); Nina Bojkova, Monroeville, PA (US); Paul P. Greigger, Cranberry Township, PA (US); Gregory J. McCollum, Gibsonia, PA (US); John R. Gilmore, Valencia, CA (US); Chandra B. Rao, Valencia, CA (US)

(73) Assignee: PRC De Soto International, Inc., Sylmar, CA (US)

( * ) Notice: Subject to any disclaimer, the term of this patent is extended or adjusted under 35 U.S.C. 154(b) by 1489 days.

This patent is subject to a terminal disclaimer.

(21) Appl. No.: 11/773,051

(22) Filed: Jul. 3, 2007

Related U.S. Application Data

(63) Continuation-in-part of application No. 11/744,259, filed on May 4, 2007.

(60) Provisional application No. 60/797,985, filed on May 5, 2006.

(51) Int. Cl.
*C08G 18/32* (2006.01)

(52) U.S. Cl.
USPC ............... 528/61; 528/60; 528/63; 528/64; 528/73; 528/76; 528/80; 528/85; 428/423.1

(58) Field of Classification Search
USPC ............ 528/60, 61, 63, 64, 73, 76, 80, 85; 428/423.1
See application file for complete search history.

(56) References Cited

U.S. PATENT DOCUMENTS

| | | | |
|---|---|---|---|
| 3,454,539 A | 7/1969 | Greenlee | |
| 3,592,798 A | 7/1971 | Oswald | |
| 3,661,744 A | 5/1972 | Kehr et al. | |
| 3,662,023 A | 5/1972 | Kehr et al. | |
| 3,714,290 A | 1/1973 | Kehr et al. | |
| 3,725,229 A | 4/1973 | Kehr et al. | |
| 3,729,403 A | 4/1973 | Kehr et al. | |
| 3,872,150 A | 3/1975 | Kehr et al. | |
| 3,872,151 A | 3/1975 | Kehr et al. | |
| 3,872,152 A | 3/1975 | Kehr et al. | |
| 3,898,349 A | 8/1975 | Kehr et al. | |
| 3,931,287 A | 1/1976 | Kehr et al. | |
| 4,046,729 A | 9/1977 | Scriven et al. | |
| 4,327,204 A * | 4/1982 | Oyaizu et al. | 528/61 |
| 4,366,307 A | 12/1982 | Singh et al. | |
| 4,602,071 A | 7/1986 | Wellner et al. | |
| 4,609,762 A | 9/1986 | Morris et al. | |
| 5,225,472 A | 7/1993 | Cameron et al. | |
| 5,614,605 A * | 3/1997 | Mafoti et al. | 528/44 |
| 5,912,319 A | 6/1999 | Zook et al. | |
| 6,172,179 B1 | 1/2001 | Zook et al. | |
| 6,232,401 B1 | 5/2001 | Zook et al. | |
| 6,372,849 B2 * | 4/2002 | DeMoss et al. | 525/212 |
| 6,509,418 B1 | 1/2003 | Zook et al. | |
| 2003/0017341 A1 | 1/2003 | Gross et al. | |
| 2004/0143090 A1 | 7/2004 | Bojkova et al. | |
| 2005/0010003 A1 | 1/2005 | Sawant et al. | |
| 2005/0282991 A1* | 12/2005 | Bojkova et al. | 528/44 |
| 2006/0057394 A1 | 3/2006 | Cork et al. | |
| 2006/0058492 A1* | 3/2006 | Cork | 528/44 |
| 2006/0241273 A1 | 10/2006 | Bojkova et al. | |
| 2006/0293485 A1* | 12/2006 | Rink et al. | 528/44 |

FOREIGN PATENT DOCUMENTS

| | | |
|---|---|---|
| WO | 01/36508 | 5/2001 |
| WO | WO 2004/018115 | 3/2004 |

OTHER PUBLICATIONS

U.S. Appl. No. 11/744,266, filed May 4, 2007, entitled: "Compositions Comprising Thioether-Functional Ogliomeric Polythiols", Inventors: Szymanski et al.

* cited by examiner

*Primary Examiner* — Michael L Leonard
(74) *Attorney, Agent, or Firm* — Krisanne Saideler

(57) ABSTRACT

Polyurea/polythiourea compositions comprising the reaction product of a first component comprising isocyanate and a second component comprising an amine, wherein the first component further comprises an isocyanate functional polythioether-polyurethane and/or polythiourethane, and/or the second component further comprises an amine/hydroxy functional polythioether, are disclosed. Methods for using the coating, and substrates coated therewith, are also disclosed.

15 Claims, No Drawings

POLYUREA/POLYTHIOUREA COATINGS

CROSS-REFERENCE TO RELATED APPLICATIONS

This patent application is a Continuation-In-Part (CIP) of U.S. patent application having Ser. No. 11/744,259, filed on May 4, 2007 and pending, which claims priority to U.S. Provisional Patent Application 60/797,985 filed on May 5, 2006, and which are hereby incorporated by reference in their entirety.

FIELD OF THE INVENTION

The present invention is directed to a coating composition comprising polyurea and polythiourea.

BACKGROUND OF THE INVENTION

Coating compositions comprising polyureas are used in a wide variety of industries such as automotive, watercraft, aircraft, industrial, construction, military, recreational equipment including sports equipment and the like. In these industries, considerable efforts have been made to develop coating compositions that will impart the desired properties to the substrate or article being coated. For example, coatings are used to protect against damage due to corrosion, abrasion, impact, chemicals, ultraviolet light, flame, heat, and/or other environmental exposure. In addition to any of these functional properties, coatings can also be used for decorative purposes.

Sulfur-containing compounds are known to be well suited for use in aerospace sealants due to their fuel resistant nature upon crosslinking. For example, polysulfide sealants can offer high tensile strength, high tear strength, thermal resistance and resistance to high ultraviolet light. Such sealants can also offer resistance to fuel and maintain their adhesion upon exposure to fuel.

Polyureas are generally formed by reacting amines and isocyanates. The use of amines such as polyamines as crosslinkers or "curatives" is well known. For example, amines are known to crosslink with isocyanates to form urea compounds. Similarly, sulfur-containing compounds are known to crosslink with isocyanates to form thiourea compounds. The use of sulfur-containing compounds in a polyurea coating, however, has been difficult due to the high viscosity and odor of the sulfur-containing compounds. Combinations, however, would be desirable to provide optimum properties.

SUMMARY OF THE INVENTION

The present invention is directed to a coating composition comprising polyurea and polythiourea formed from a reaction mixture comprising a first component comprising an isocyanate and an isocyanate functional polythioether-polyurethane and/or polythiourethane, and a second component comprising an amine.

The present invention is also directed to a coating composition comprising polyurea and polythiourea formed from a reaction mixture comprising a first component comprising an isocyanate, and a second component comprising an amine and an amine/hydroxy functional polythioether.

The present invention is also directed to a coating composition comprising polyurea and polythiourea formed from a reaction mixture comprising a first component comprising an isocyanate and an isocyanate functional polythioether-polyurethane and/or polythiourethane, and a second component comprising an amine and an amine/hydroxy functional polythioether.

The present invention is further directed to methods for coating a substrate using such coatings, and substrates coated thereby.

DETAILED DESCRIPTION OF THE INVENTION

The present invention is directed to a coating composition comprising polyurea and polythiourea formed from a reaction mixture comprising a first component comprising isocyanate ("isocyanate component"), a second component comprising an amine ("amine component"), and a sulfur-containing compound in the first and/or second component. The first component further comprises an isocyanate functional polythioether-polyurethane and/or polythiourethane, and/or the second component further comprises an amine/hydroxy functional polythioether. The amine component may be referred to herein as a "curative" because it will react or cure with the isocyanate to form a polyurea and/or a polythiourea. In certain embodiments, the ratio of equivalents of isocyanate groups to equivalents of amine/mercaptan groups is greater than 1 and the isocyanate component and the amine component can be applied to a substrate at a volume mixing ratio of 1:1. The terms "mercaptan" and variants thereof and "thiol" and variants thereof are used interchangeably herein.

As used herein, the term "isocyanate" includes unblocked compounds capable of forming a covalent bond with a reactive group such as a hydroxyl, mercaptan or amine functional group. Thus, isocyanate can refer to "free isocyanate", which will be understood to those skilled in the art. In alternate non-limiting embodiments, the isocyanate of the present invention can be monofunctional containing one isocyanate functional group (NCO) or the isocyanate used in the present invention can be polyfunctional containing two or more isocyanate functional groups (NCOs).

Suitable isocyanates for use in the present invention are numerous and can vary widely. Such isocyanates can include those that are known in the art. Non-limiting examples of suitable isocyanates can include monomeric and/or polymeric isocyanates. The polyisocyanates can be selected from monomers, prepolymers, oligomers, or blends thereof. In an embodiment, the polyisocyanate can be $C_2$-$C_{20}$ linear, branched, cyclic, aromatic, or blends thereof.

Suitable isocyanates for use in the present invention may include but are not limited to isophorone diisocyanate (IPDI), which is 3,3,5-trimethyl-5-isocyanato-methyl-cyclohexyl isocyanate; hydrogenated materials such as cyclohexylene diisocyanate, 4,4'-methylenedicyclohexyl diisocyanate ($H_{12}$MDI); mixed aralkyl diisocyanates such as tetramethylxylyl diisocyanates, OCN—$C(CH_3)_2$—$C_6H_4C(CH_3)_2$—NCO; polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate; and mixtures thereof.

Non-limiting examples of aromatic isocyanates for use in the present invention may include but are not limited to phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate, alkylated benzene diisocyanates, methylene-interrupted aromatic diisocyanates such as methylenediphenyl diisocyanate, 4,4'-isomer (MDI) including alkylated analogs such as 3,3'-dimethyl-4,4'-diphenylmethane diisocyanate, polymeric methylenediphenyl diisocyanate and mixtures thereof.

In a non-limiting embodiment, polyisocyanate monomer may be used. It is believed that the use of a polyisocyanate monomer (i.e., residual-free monomer from the preparation of prepolymer) may decrease the viscosity of the polyurea/polythiourea composition thereby improving its flowability, and may provide improved adhesion of the polyurea/polythiourea coating to a previously applied coating and/or to an uncoated substrate. For example, the coatings that have been previously applied to a substrate can comprise functional groups (e.g. hydroxy groups) that are reactive with isocyanates, thereby enhancing adhesion of this coating to the polyurea/polythiourea composition of the present invention applied over this coating. A lower viscosity polyurea/polythiourea composition may also remain in a "flowable" state for a longer period of time as compared to a comparable composition having a higher viscosity. In alternate embodiments of the present invention, at least 1 percent by weight, or at least 2 percent by weight, or at least 4 percent by weight of the isocyanate component comprises at least one polyisocyanate monomer.

In a further embodiment of the invention, the isocyanate can include oligomeric polyisocyanates including but not limited to dimers, such as the uretdione of 1,6-hexamethylene diisocyanate, trimers, such as the biuret and isocyanurate of 1,6-hexanediisocyanate and the isocyanurate of isophorone diisocyanate, allophonates and polymeric oligomers. Modified polyisocyanates can also be used, including but not limited to carbodiimides and uretdiones, and mixtures thereof. Suitable materials include, without limitation, those available under the designation DESMODUR from Bayer Corporation of Pittsburgh, Pa. and include DESMODUR N 3200, DESMODUR N 3300, DESMODUR N 3400, DESMODUR XP 2410, and DESMODUR XP 2580.

As used herein, "isocyanate prepolymer" includes polyisocyanate that is pre-reacted with a polyamine, sulfur-containing compound having a reactive group and/or another isocyanate reactive group such as polyol. Suitable polyisocyanates include those previously disclosed herein. Suitable polyamines are numerous and may be selected from a wide variety known in the art. Examples of suitable polyamines include but are not limited to primary and secondary amines, and mixtures thereof, such as any of those listed herein. Amine terminated polyureas may also be used. Amines comprising tertiary amine functionality can be used provided that the amine further comprises at least two primary and/or secondary amino groups. Suitable polyols are numerous and may be selected from a wide variety known in the art. Examples of suitable polyols include but are not limited to polyether polyols, polyester polyols, polyurea polyols (e.g. the Michael reaction product of an amino function polyurea with a hydroxyl functional (meth)acrylate), polycaprolactone polyols, polycarbonate polyols, polyurethane polyols, poly vinyl alcohols, addition polymers of unsaturated monomers with pendant hydroxyl groups such as those containing hydroxy functional (meth)acrylates, allyl alcohols and mixtures thereof.

In certain embodiments, the isocyanate includes an isocyanate prepolymer and in other embodiments the isocyanate includes an isocyanate prepolymer and one or more additional isocyanates, such as one or more of the polyisocyanates described above.

As noted above, the polyurea/polythiourea of the present compositions is formed from a reaction mixture comprising an isocyanate component and an amine component.

Suitable amines for use in the amine component of the present invention can be selected from a wide variety of known amines, such as primary and secondary amines, and mixtures thereof including polyamines having at least two functional groups, such as di-, tri-, or higher functional polyamines and mixtures thereof. The amine or amines used may be aromatic or aliphatic, such as cycloaliphatic, or mixtures thereof. Suitable monoamines include but are not limited to primary amines of the formula $R_8$—$NH_2$, where $R_8$ is a hydrocarbon radical that may represent a straight chain or branched alkyl group, an aryl-alkyl group, a hydroxyalkyl group or an alkoxyalkyl group. Other examples of suitable aliphatic mono and polyamines include but are not limited to ethylamine, isomeric propylamines, butylamines (e.g. butylamine, isobutylamine, sec-butylamine, and tert-butylamine), pentylamines, hexylamines, cyclohexylamine, ethylene diamine, 1,2-diaminopropane, 1,4-diaminobutane, 1,3-diaminopentane (DYTEK EP, Invista), 1,6-diaminohexane, 2-methyl-1,5-pentane diamine (DYTEK A, Invista), 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluoylene diamine, 2,4'-diaminodicyclohexyl methane, 4,4'-diaminodicyclohexyl methane (PACM-20, Air Products) and 3,3'-dialkyl-4,4'-diaminodicyclohexyl methanes (such as 3,3'-dimethyl-4,4'-diaminodicyclohexyl methane (DIMETHYL DICYKAN or LAROMIN C260, BASF; ANCAMINE 2049, Air Products) and 3,3'-diethyl-4,4'-diaminodicyclohexyl methane), 2,4- and/or 2,6-diaminotoluene and 2,4'- and/or 4,4'-diaminodiphenyl methane, or mixtures thereof. Additional suitable amines include but are not limited to 2-ethylhexylamine, octylamine, tert-octylamine, dodecylamine, octadecylamine, 3-(cyclohexylamine)propylamine, 3,3'-[1,4-butanediylbis]-1-propanamine, and diamino functional polyetheramines having aliphatically bound primary amino groups, examples of which include JEFFAMINE D-230, JEFFAMINE D-400, JEFFAMINE D-2000, and JEFFAMINE D-4000 available from Huntsman Corporation. It will be appreciated that when the amine is hindered, the reaction time between the amine and the isocyanate may be slower. This gives a longer pot-life or work-processing time in those situations where a longer processing time is desired.

In certain embodiments the polyamine is a triamine. Examples of suitable triamines include dipropylene triamine, bis(hexamethylene)triamine and triamino functional polyetherpolyamines having aliphatically bound primary amino groups (JEFFAMINE T-403, JEFFAMINE T-3000, JEFFAMINE T-5000 from Huntsman Corporation.) In other embodiments the amine can be a tetraamine or other higher functional amine.

The amine component may comprise an amine/(meth)acrylate oligomeric reaction product, and/or one or more other amine curatives. As used herein, and as will be appreciated by those skilled in the art, "(meth)acrylate" and like terms refers to both the acrylate and the corresponding methacrylate. For example, the second component may comprise one or more amines that are the reaction product of a polyamine, a poly(meth)acrylate, and a mono(meth)acrylate or a monoamine, such as those described in U.S. patent application Ser. No. 11/611,979, incorporated by reference herein; one or more amines that are the reaction product of an amine, a (meth)acrylate and a dialkyl maleate and/or dialkyl fumarate, such as those described in U.S. patent application Ser. No. 11/611,988, incorporated by reference herein; one or more amines that are the reaction product of a polyamine and a mono(meth)acrylate, such as those described in U.S. patent application Ser. No. 11/611,982, incorporated by reference herein; one or more amines that are the reaction product of a monoamine and a (meth)acrylate, such as those described in U.S. patent application Ser. No. 11/611,984, incorporated by reference herein; and/or one or more amines that are the reaction product of a triamine and a dialkyl maleate and/or dialkyl fumarate, such as those described in U.S. patent application Ser. No. 11/611,986, incorporated by reference herein.

The present compositions, as noted above, can additionally include other amines, such as those known in the art including but not limited to any polyamines or combinations thereof listed herein. Other amines include secondary cycloaliphatic diamines such as JEFFLINK 754 (Huntsman Corporation, Houston, Tex.) and CLEARLINK 1000 (Dorf-Ketal Chemicals, LLC), aspartic ester functional amines, such as those available under the name DESMOPHEN such as DESMOPHEN NH1120, DESMOPHEN NH 1420, and DESMOPHEN NH 1520 (Bayer Corporation), other aspartic ester functional materials, such as the reaction products of triamines that comprise at least one secondary amino group prior to reaction with a dialkyl maleate and/or dialkyl fumarate including but not limited to the reaction products of diethylene triamine, dipropylene triamine, and bis-hexamethylene triamine with a dialkyl maleate and/or dialkyl fumarate; examples of such materials include the adduct of dipropylene triamine and diethyl maleate, the adduct of dipropylene triamine and dibutyl maleate, the adduct of bis-hexamethylene triamine with diethyl maleate, and the adduct of bis-hexamethylene triamine with dibutyl maleate. Polyoxyalkyleneamines are also suitable. Polyoxyalkyleneamines comprise two of more primary or secondary amino groups attached to a backbone, derived, for example, from propylene oxide, ethylene oxide, butylene oxide or a mixture thereof. Examples of such amines include those available under the designation JEFFAMINE, such as, without limitation, JEFFAMINE D-230, D-400, D-2000, HK-511, ED-600, ED-900, ED-2003, T-403, T-3000, T-5000, SD-231, SD-401, SD-2001, and ST-404 (Huntsman Corporation). Such amines have an approximate molecular weight ranging from 200 to 7500.

Other suitable secondary amines that can be included in the present composition are reaction products of materials comprising primary amine functionality with acrylonitrile. Suitable amines include any polyamine listed herein comprising primary amino functionality. One example of such a material is the adduct of 4,4'-diaminodicyclohexylmethane and acrylonitrile. An example of a commercially available material is the adduct of isophorone diamine and acrylonitrile sold under the designation POLYCLEAR 136, (Hansen Group LLC).

Other amines that can be used are adducts of primary polyamines with mono or polyepoxies; an example of such a material is the adduct of isophorone diamine with CARDURA E10P (available from Hexion Speciality Chemicals, Inc).

In certain embodiments, the second component of the composition, and/or the composition itself, are substantially free of primary amine functionality (unreacted primary amino groups). "Substantially free of primary amine functionality" and like terms means that theoretically there is no primary amine functionality but there maybe some primary amine functionality present that is purely incidental, i.e. impurities in amines that are otherwise secondary amine functional and/or trace primary amine functionality that did not react.

As noted above, the first and/or second component of the present compositions further comprises a sulfur-containing compound. As used herein, the term "sulfur-containing compound" refers to any compound having at least one sulfur atom, including, but not limited to, a thiol, a polythiol, a thioether, a polythioether and a polysulfide. A "thiol" as used herein refers to a compound having a thiol or mercaptan group, that is, an "SH" group. A "polythiol" refers to such a compound having more than one SH group, such as a dithiol or higher functionality thiol. Such groups are typically terminal and/or pendent such that they have an active hydrogen that is reactive with other functional groups. A "thioether" or "polythioether" refers to a compound that contains one or more sulfur atoms, respectively, such as within the backbone of the polymer, that do not contain an active hydrogen group; that is, they are bonded on either side to another sulfur atom, a carbon atom, and the like. A "polythiol" can comprise both a terminal and/or pendant sulfur (—SH) and a non-reactive sulfur atom (—S—). Thus, the term "polythiol" generally encompassed "polythioether" as well. Suitable polythiols include, for example, those disclosed in U.S. Pat. No. 7,009,032, incorporated by reference herein. Any sulfur-containing compound used according to the present invention can further comprise additional functionality, including but not limited to hydroxyl functionality and epoxy functionality.

In certain embodiments, the sulfur-containing compound can comprise, but is not limited to, an amine/hydroxy-functional polythioether. As used herein, the term "amine/hydroxy-functional polythioether" refers to polythioethers containing one or more amine functional groups and/or one or more hydroxy functional groups. In certain embodiments of the present invention, the amine/hydroxy-functional polythioether comprises at least one, in some cases two, primary amine groups, at least one, in some cases two, secondary amine groups, and at least one, in some cases two, hydroxy groups.

The amine/hydroxy functional polythioethers utilized in certain embodiments of the present invention can be made by any of a variety of methods. In certain embodiments, the amine/hydroxy functional polythioether is derived from an epoxy functional polythioether. As used herein, the term "epoxy functional polythioether" refers to a compound comprising a polythioether and one or more epoxy functional groups. In certain embodiments, the amine/hydroxy functional polythioether is derived from an epoxy-functional polythioether including the structure (I):

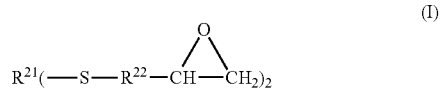

(I)

wherein $R^{21}$ denotes a $C_{2-10}$ n-alkylene group, such as a $C_{2-6}$ n-alkylene group; a $C_{2-6}$ branched alkylene group, such as a $C_{3-6}$ branched alkylene group having one or more pendant groups which can be, for example, alkyl groups, such as methyl or ethyl groups; an alkyleneoxy group; a $C_{6-8}$ cycloalkylene group; a $C_{6-10}$ alkylcycloalkylene group; a heterocyclic group; or —[(—CHR$^3$—)$_s$—X—]$_q$— (—CHR$^3$—)$_r$—, wherein s is an integer having a value ranging from 2 to 6, q is an integer having a value ranging from 1 to 5, r is an integer having a value ranging from 2 to 10, $R^3$ is hydrogen or methyl, and X denotes O, S, or —NR$_2$—, wherein R denotes an alkyl group; and each $R^{22}$ is a divalent linking group, such as alkylene or oxyalkylene containing from 3 to 20 carbon atoms.

In certain embodiments, $R^{21}$ in structure (I) is derived from a compound, monomer, and/or polymer having at least two thiol groups, such as, for example, a compound having the structure (II):

HS—R$^1$—SH wherein $R^1$ is as defined above for $R^{21}$ in structure (I).

Suitable dithiols for use in preparing the epoxy functional polythiother used to produce the amine/hydroxy functional polythioethers utilized in certain embodiments of the present invention include the compounds of structure (II) which are dithiol compounds. In certain embodiments, such dithiols include those compounds in which $R^1$ is a $C_{2-6}$ n-alkylene group, i.e., 1,2-ethanedithiol, 1,3-propanedithiol, 1,4-butanedithiol, 1,5-pentanedithiol or 1,6-hexanedithiol.

Other suitable dithiols include those compounds in which $R^1$ is a $C_{3-6}$ branched alkylene group, having one or more pendent groups which can be, for example, methyl or ethyl groups. Suitable compounds having branched alkylene $R^1$ include 1,2-propanedithiol, 1,3-butanedithiol, 2,3-butanedithiol, 1,3-pentanedithiol and 1,3-dithio-3-methylbutane. Other useful dithiols include those in which $R^1$ is a $C_{6-8}$ cycloalkylene or $C_{6-10}$ alkylcycloalkylene group, for example, dipentenedimercaptan and ethylcyclohexyldithiol (ECHDT).

Further suitable dithiols include one or more heteroatom substituents in the carbon backbone, that is, dithiols in which X is a heteroatom such as O, S or another bivalent heteroatom radical; a secondary or tertiary amine group, i.e., $-NR^6-$, where $R^6$ is hydrogen or methyl; or another substituted trivalent heteroatom. In certain embodiments, X is O or S, and thus $R^1$ is $-[(-CHR^3-)_s-O-]_q-(-CHR^3-)_r-$ or $-[(-CHR^3-)_s-S-]_q-(-CHR^3-)_r-$. In certain embodiments, the indices s and r are equal, and, in some cases, both have the value of 2. Exemplary dithiols of this type include dimercaptodiethylsulfide (DMDS) (s, r=2, q=1, X=S); dimercaptodioxaoctane (DMDO) (s, q, r=2, X=O); and 1,5-dimercapto-3-oxapentane (s,r=2, q=1, X=O). It is also possible to employ dithiols that include both heteroatom substituents in the carbon backbone and pendent alkyl, such as methyl, groups. Such compounds include methyl-substituted DMDS, such as $HS-CH_2CH(CH_3)-S-CH_2CH_2-SH$, $HS-CH(CH_3)CH_2-S-CH_2CH_2-SH$ and dimethyl substituted DMDS, such as $HS-CH_2CH(CH_3)-S-CH(CH_3)CH_2-SH$ and $HS-CH(CH_3)CH_2-S-CH_2CH(CH_3)-SH$. Two or more different dithiols of structure (II) can also be employed if desired.

In certain embodiments of epoxy-functional polythioethers having the structure (I), $R^{21}$ may be a $C_{2-6}$ n-alkylene group, for example, 1,2-ethylenedithiol, 1,3-propylenedithiol, 1,4-butylenedithiol, 1,5-pentylenedithiol, or 1,6-hexylenedithiol. In other embodiments, $R^{21}$ in structure (I) may be a $C_{3-6}$ branched alkylene group having one or more pendent groups, for example, 1,2-propylenedithiol, 1,3-butylenedithiol, 2,3-butylenedithiol, 1,3-pentylenedithiol, and 1,3-dithio-3-methylbutylene. In certain embodiments, $R^{21}$ may be a $C_{6-8}$ cycloalkylene or $C_{6-10}$ alkylcycloalkylene group, for example, dipentylenedimercaptan, and ethylcyclohexylenedithiol (ECHDT).

In certain embodiments, the amine/hydroxy functional polythioether included in the compositions of the present invention is derived from an epoxy functional polythioether that is, in turn, prepared by reacting, for example, a divinyl ether or mixture of divinyl ethers with an excess of a dithiol or a mixture of dithiols. In certain embodiments, (n+1) moles of a polythiol having the structure (II) or a mixture of at least two polythiols having the structure (II) are reacted with (n) moles of a polyvinyl ether having the structure (III):

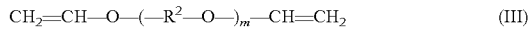

$$CH_2=CH-O-(-R^2-O-)_m-CH=CH_2 \quad\quad (III)$$

or a mixture of at least two different compounds having the structure (III), in the presence of a catalyst. In structure (III), $R^2$ denotes methylene; a $C_{2-10}$ n-alkylene group, such as a $C_{2-6}$ n-alkylene group; a $C_{2-6}$ branched alkylene group, such as a $C_{3-6}$ branched alkylene group; a $C_{6-8}$ cycloalkylene group; a $C_{6-14}$ alkylcycloalkylene, such as a $C_{6-10}$ alkylcycloalkylene; a heterocyclic group, or $-[(-CHR^3-)_s-X-]_q-(-CHR^3-)_r-$, wherein s, q, r, $R^3$ and X are as defined above in structure (I); and m is a rational number having a value ranging from 0 to 50, such as 0 to 10 or 1 to 10. This method affords a thiol-terminated difunctional polythioether.

The compounds of structure (III) are divinyl ethers. Divinyl ether itself (m=0) can be used. Other suitable divinyl ethers include those compounds having at least one oxyalkylene group, such as from 1 to 4 oxyalkylene groups (i.e., those compounds in which m is an integer from 1 to 4). In certain embodiments, m is an integer from 2 to 4. It is also possible to employ commercially available divinyl ether mixtures in producing suitable polythioethers. Such mixtures are characterized by a non-integral average value for the number of alkoxy units per molecule. Thus, m in structure (III) can also take on non-integral, rational values between 0 and 10, such as between 1 and 10, or, in some cases, between 1 and 4, such as between 2 and 4.

Exemplary divinyl ethers include those compounds in which $R^2$ is $C_{2-6}$ n-alkylene or $C_{2-6}$ branched alkylene, such as ethylene glycol divinyl ether (EG-DVE) ($R^2$=ethylene, m=1); butanediol divinyl ether (BD-DVE) ($R^2$ butylene, m=1); hexanediol divinyl ether (HD-DVE) ($R^2$=hexylene, m=1); diethylene glycol divinyl ether (DEG-DVE) ($R^2$=ethylene, m=2); triethylene glycol divinyl ether ($R^2$=ethylene, m=3); tetraethylene glycol divinyl ether ($R^2$=ethylene, m=4) and polytetrahydrofuryl divinyl ether. In certain embodiments, the polyvinyl ether monomer can further comprise one or more pendent groups selected from alkylene groups, hydroxyl groups, alkeneoxy groups, and amine groups. Useful divinyl ether blends include "PLURIOL®" type blends such as PLURIOL® E-200 divinyl ether (commercially available from BASF), for which $R^2$=ethyl and m=3.8, as well as "DPE" polymeric blends such as DPE-2 and DPE-3 (commercially available from International Specialty Products, Wayne, N.J.).

Useful divinyl ethers in which $R^2$ is $C_{2-6}$ branched alkylene can be prepared by reacting a polyhydroxy compound with acetylene. Exemplary compounds of this type include compounds in which $R^2$ is an alkyl-substituted methylene group such as $-CH(CH_3)-$ or an alkyl-substituted ethylene such as $-CH_2CH(CH_3)-$.

Other useful divinyl ethers include compounds in which $R^2$ is polytetrahydrofuryl (poly-THF) or polyoxyalkylene, in some cases having an average of about 3 monomer units.

In some cases, trivinyl ether monomers such as trimethylolpropane trivinyl ether; tetrafunctional vinyl ether monomers such as pentaerythritol tetravinyl ether; and mixtures thereof, can be used.

Two or more compounds of the structure (III) can be used. Thus, in certain embodiments, two compounds of structure (II) and one compound of structure (III), one compound of formula structure (II) and two compounds of structure (III), two compounds of structure (II) and of structure (III), and more than two compounds of one or both structures, can be used to produce a variety of polythioethers, and all such combinations of compounds are contemplated as being suitable for use in the present invention.

Although, as indicated above, compounds of the structures (II) and (III) which have pendent alkyl groups, for example pendent methyl groups, are useful in the invention, compounds of the structures (II) and (III), which are free of pendent methyl or other alkyl groups, also afford polythioethers that are suitable for use in the present invention.

The reaction between the compounds of structures (II) and (III) is sometimes catalyzed by a free radical catalyst. Suitable free radical catalysts include azo compounds, for example azobisnitrile compounds such as azo(bis)isobutyronitrile (AIBN); organic peroxides such as benzoyl peroxide and t-butyl peroxide; and similar free-radical generators. The reaction can also be effected by irradiation with ultraviolet light either with or without the use of a photosensitizer, such as benzophenone.

The reaction between a dithiol and a polyvinyl ether to prepare a polythiol having the structure (II) is also described in U.S. Pat. No. 5,912,319.

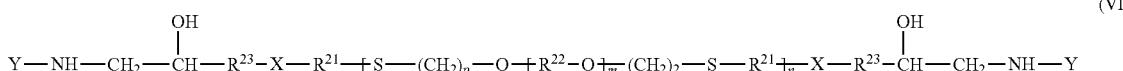
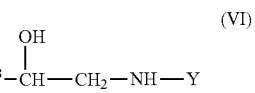

In structure (I), $R^{22}$ is a divalent linking group. In certain embodiments, $R^{22}$ may be derived from a monoepoxide having the structure (IV):

in which $R^{22}$ includes groups that are reactive with thiols such as, for example, olefinic groups. The olefinic group may be an alkylene group or an oxyalkylene group having from 3 to 20 carbon atoms, such as from 3 to 5 carbon atoms. In certain embodiments, the monoepoxides having the structure (IV) include allyl glycidyl ether, 1,2-epoxy-5-hexene, 1,2-epoxy-7-octene, 1,2-epoxy-9-decene, 4-vinyl-1-cyclohexene 1,2-epoxide, butadiene monoepoxide, isoprene monoepoxide, and limonene monoepoxide.

In certain embodiments, therefore, the amine/hydroxy functional polythioether included in the compositions of the present invention is derived from an epoxy functional polythioether that is the reaction product of a dithiol, a diolefin, and a monoepoxy olefin, having the following structure (V):

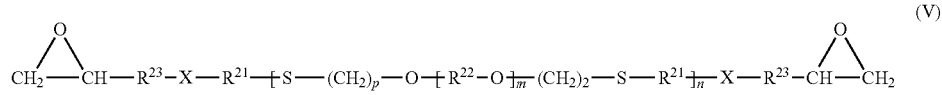

in which $R^{21}$ and $R^{22}$ are as described above with respect to structure (I); p is an integer from 2 to 6, m is a rational number having a value ranging from 0 to 50, such as 0 to 10 or 1 to 10, n is an integer from 1 to 60, such as 1 to 10, in some cases 2; and each $R^{23}$ is a divalent linking group.

Suitable epoxy-functional polythioethers are commercially available under the tradename Permapol® L-5534 from PRC-DeSoto International, Inc., Burbank, Calif.

In certain embodiments, the amine/hydroxy functional polythioethers utilized in certain embodiments of the present invention are prepared by reacting one or more epoxy functional polythioethers of the type previously described with an excess of one or more polyamines. Thus, in certain embodiments, for example, (n) moles of one or more epoxy functional polythioethers are reacted with (>n) moles of one or more polyamines comprising two or more amine groups per molecule.

Polyamines suitable for use in the production of the amine/hydroxy functional polythioethers utilized in certain embodiments of the present invention are numerous and can vary widely. Such polyamines can include those that are known in the art, and can include, but are not limited to, any of the polyamines previously disclosed herein.

As will be appreciated from the foregoing description, in certain embodiments, the compositions of the present invention comprise an amine/hydroxy functional polythioether of the structure (VI):

in which $R^{21}$, $R^{22}$, $R^{23}$, p, m and n are as were defined above with respect to structure (V) and Y is an amine group containing moiety, in some cases a primary amine group containing moiety comprising one or more aromatic rings.

In certain embodiments, the amine/hydroxy functional polythioether described above is a liquid at room temperature. Moreover, in certain embodiments, the previously described amine/hydroxy functional polythioether has a viscosity, at 100% solids, of no more than 50 poise, such as no more than 10 poise, as measured at a temperature of about 25° C. and a pressure of 760 mm Hg determined according to ASTM D-2849 §79-90 using a Brookfield CAP 2000 viscometer. Any end point within the foregoing ranges can be used.

In certain embodiments, the amine/hydroxy functional polythioether described above has a number average molecular weight of 500 to 2000 grams per mole, such as 1200 to 1300 grams per mole, the molecular weight being determined by gel-permeation chromatography using a polystyrene standard. Any endpoints within the foregoing ranges can be used.

The Examples herein further illustrate suitable methods for making an amine/hydroxy functional polythioether suitable for use in the present invention.

The sulfur-containing compound can also be the form of a prepolymer. This is particularly relevant if the sulfur-containing compound is in the isocyanate component. It will be appreciated that inclusion of a sulfur-containing compound having an active hydrogen in the isocyanate component will result in a reaction between the active hydrogen and the isocyanate. Accordingly, when used in the isocyanate component, the sulfur-containing compound should have substantially no residual active hydrogens that will react with the isocyanate. A prepolymer formed between the sulfur-containing compound and the isocyanate can be made, such as one prepared by reacting a mercaptan terminated disulfide with an isocyanate.

In certain embodiments, the prepolymer can comprise, but is not limited to, an isocyanate functional polythioether-polyurethane and/or polythiourethane. As used herein, the term "isocyanate functional polythioether-polyurethane and/or polythiourethane" refers to a compound comprising a polythioether, at least one of a urethane linkage (—NH—C(O)—O—) and/or a thiourethane linkage (—NH—C(O)—S—), and one or more isocyanate functional groups. In certain embodiments, the isocyanate functional polythioether-polyurethane and/or polythiourethane utilized in the present invention comprises a plurality of isocyanate groups, in some case two isocyanate groups, per molecule.

The isocyanate functional polythioether-polyurethanes and/or polythiourethanes included in certain embodiments of the compositions of the present invention can be prepared, for example, by reacting one or more isocyanate reactive polythioethers, such as thiol-functional and/or hydroxy-functional polythioethers, with an excess of one or more isocyanate functional compounds, as discussed in detail below.

In certain embodiments, the isocyanate functional polythioether-polyurethane and/or polythiourethane included in the compositions of the present invention is derived from a polythioether comprising at least two reactive thiol groups, in some cases, such a polythioether has two reactive thiol groups. Each thiol group, that is, the —SH group, is capable of forming a thiourethane linkage, i.e., a —NH—C(O)—S— linkage, with an isocyanate group.

In certain embodiments, the polythioether comprising at least two reactive thiol groups comprises a difunctional thiol-terminated polythioether, such as, for example, those having the following structure (VI):

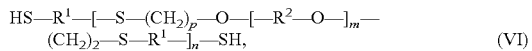
HS—R$^1$—[—S—(CH$_2$)$_p$—O—[—R$^2$—O—]$_m$—(CH$_2$)$_2$—S—R$^1$—]$_n$—SH, (VI)

wherein
each R$^1$ independently denotes a C$_{2-10}$ n-alkylene group, such as a C$_{2-6}$ n-alkylene group; a C$_{2-6}$ branched alkylene group, such as a C$_{3-6}$ branched alkylene group having one or more pendant groups which can be, for example, alkyl groups, such as methyl or ethyl groups; an alkyleneoxy group; a C$_{6-8}$ cycloalkylene group; a C$_{6-10}$ alkylcycloalkylene group; a heterocyclic group; or —[(—CHR$^3$—)$_s$—X—]$_q$—(—CHR$^3$—)$_r$—, wherein s is an integer having a value ranging from 2 to 6, q is an integer having a value ranging from 1 to 5, r is an integer having a value ranging from 2 to 10, R$^3$ is hydrogen or methyl, and X denotes O, S, or —NR$_2$—, wherein R denotes an alkyl group; R$^2$ independently denotes methylene; a C$_{2-10}$ n-alkylene group, such as a C$_{2-6}$ n-alkylene group; a C$_{2-6}$ branched alkylene group, such as a C$_{3-6}$ branched alkylene group; a C$_{6-8}$ cycloalkylene group; a C$_{6-14}$ alkylcycloalkylene, such as a C$_{6-10}$ alkylcycloalkylene; —[(—CHR$^3$—)$_s$—X—]$_q$—(—CHR$^3$—)$_r$—; a heterocyclic group, or wherein s, q, r, R$^3$ and X are as defined above; m is a rational number having a value ranging from 0 to 50, such as 0 to 10 or 1 to 10; n is an integer having a value ranging from 1 to 60; and p is an integer having a value ranging from 2 to 6.

Such thiol-terminated polythioethers suitable for use in the present invention can be prepared by a number of methods. In certain embodiments, (n+1) moles of a compound of the earlier described structure (II) or a mixture of at least two different compounds having the structure (II), are reacted with (n) moles of a compound of the earlier described structure (III) or a mixture of at least two different compounds having the structure (III), in the presence of a catalyst. This method affords a thiol-terminated difunctional polythioether. Suitable dithiols and divinyl ethers include, without limitation, those described in detail earlier.

In certain embodiments of the present invention, the isocyanate functional polythioether-polyurethane and/or polythiourethane included in the compositions of the present invention is derived from a hydroxy-functional polythioether comprising at least two reactive hydroxy groups, in some cases, such a polythioether has two reactive hydroxy groups. As used herein, the term "hydroxy group" refers to an —OH group that is capable of forming a urethane linkage, i.e., a —NH—C(O)—O— linkage, with an isocyanate group.

Hydroxy functional polythioethers suitable for use in the present invention can be prepared by any suitable technique that will be understood by those skilled in the art. In certain embodiments of the present invention, the hydroxy functional polythiother that is utilized is derived from a thiol-functional polythioether of the type previously described herein. In these embodiments, the thiol-functional polythioether can be converted to a hydroxy-functional polythioether by reacting the thiol-functional polythiother with, for example, a lower alkyl substituted epoxide. For example, in the case of a difunctional thiol-terminated polythioether, one mole of the polythioether can be reacted with two moles of the lower alkyl substituted epoxide, such as propylene oxide and/or ethylene oxide.

As previously indicated, the isocyanate functional polythioether-polyurethanes and/or polythiourethanes included in certain embodiments of the compositions of the present invention can be prepared, for example, by reacting one or more thiol-functional polythioethers and/or one or more hydroxy-functional polythioethers, such as any of those described above, with an excess of one or more isocyanate functional compounds. Thus, in certain embodiments, for example, (n) moles of one or more thiol-functional polythioethers and/or hydroxy-functional polythioethers are reacted with (>n) moles of one or more isocyanate functional compounds.

Suitable isocyanate functional compounds useful in preparing the isocyanate functional polythioether-polyurethanes and/or polythiourethanes utilized in certain embodiments of the present invention are numerous and can vary widely. Such isocyanates can include those that are known in the art, and can include, but are not limited to, any of the isocyanates previously disclosed herein.

As will be appreciated from the foregoing description, in certain embodiments, the compositions of the present invention comprise an isocyanate functional polythioether-polyurethane and/or polythiourethane of the structure (VII)

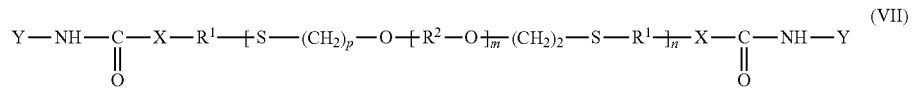
(VII)
Y—NH—C(=O)—X—R$^1$—[S—(CH$_2$)$_p$—O—[R$^2$—O]$_m$—(CH$_2$)$_2$—S—R$^1$]$_n$—X—C(=O)—NH—Y in which R$^1$, R$^2$, p, m, and n are as were defined above with respect to structure (I), each X is independently O or S, and each Y is independently an isocyanate group containing moiety, in some cases an isocyanate group moiety comprising one or more aromatic rings.

In certain embodiments, the isocyanate functional polythioether-polyurethane and/or polythiourethane described above is a liquid at room temperature. Moreover, in certain embodiments, the previously described isocyanate functional polythioether-polyurethane and/or polythiourethane has a viscosity, at 100% solids, of no more than 400 poise, such as 30-200 poise, at a temperature of about 25° C. and a pressure of about 760 mm Hg determined according to ASTM D-2849 §79-90 using a Brookfield CAP 2000 viscometer. Any endpoint within the foregoing ranges can also be used.

In certain embodiments, the isocyanate functional polythioether-polyurethane and/or polythiourethane described above has a number average molecular weight of 500 to 2000 grams per mole, such as 800 to 950 grams per mole, the molecular weight being determined by gel-permeation chromatography using a polystyrene standard. Any endpoints within the foregoing ranges can also be used.

The Examples herein further illustrate suitable methods for making isocyanate functional polythioether-polyurethanes and/or polythiourethanes that are suitable for use in the present invention.

In certain embodiments, the isocyanate functional polythioether-polyurethane and/or polythiourethane can be added to the isocyanate component and/or the amine/hydroxy-functional polythioether can be added to the amine component.

In certain embodiments, the polythiol comprises a thioether-functional polythiol prepared by reacting together compound (a) having at least two thiol functional groups, and compound (b) having triple bond functionality. In certain embodiments, the compound having triple bond functionality will be a hydroxyl functional compound, and the thioether-functional polythiol will have pendant hydroxyl functional groups.

The compound (a) having at least two thiol functional groups may comprise, for example, a polythiol or mixture thereof. In certain embodiments, the polythiol comprises dithiol, and in certain embodiments the polythiol comprises a mixture of a dithiol and another compound having more than two thiol functional groups (higher polythiol). Such mixtures may include mixtures of dithiols and/or mixtures of higher polythiols. The thiol functional groups (—SH groups) are typically terminal groups, though a minor portion (such as less than 50%, or less than 25%, of all thiol groups) may be pendant along a chain. The compound (a) may additionally contain a minor portion (such as less than 50%, or less than 25%, of all functional groups) of other active hydrogen functionality (that is, different from thiol), for example, hydroxyl functionality. The compound (a) may be linear or branched, and may contain cyclic, alkyl, aryl, aralkyl, or alkaryl groups.

The compound (a) can be selected so as to produce a substantially linear oligomeric polythiol. Therefore, when compound (a) comprises a mixture of a dithiol and a compound having more than two thiol functional groups, the compound having more than two thiol functional groups can be present in an amount that will maintain the linear nature of the polymer, such as up to 10 percent by weight of the mixture.

Suitable dithiols can include linear or branched aliphatic, cycloaliphatic, aromatic, heterocyclic, polymeric, oligomeric dithiols and mixtures thereof. The dithiol can comprise a variety of linkages including but not limited to ether linkages (—O—), sulfide linkages (—S—), polysulfide linkages (—$S_x$—, wherein x is at least 2, such as from 2 to 4) and combinations of such linkages.

Non-limiting examples of suitable dithiols for use in the present invention can include but are not limited to 2,5-dimercaptomethyl-1,4-dithiane, dimercaptodiethylsulfide (DMDS), ethanedithiol, 3,6-dioxa-1,8-octanedithiol, ethylene glycol di(2-mercaptoacetate), ethylene glycol di(3-mercaptopropionate), poly(ethylene glycol) di(2-mercaptoacetate) and poly(ethylene glycol) di(3-mercaptopropionate), benzenedithiol, 4-tert-butyl-1,2-benzenedithiol, 4,4'-thiodibenzenethiol, and mixtures thereof.

The dithiol may include dithiol oligomers having disulfide linkages such as materials represented by the following graphic formula VIII:

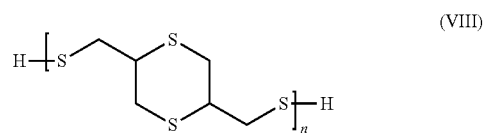

wherein n can represent an integer from 1 to 21.

Dithiol oligomers represented by Formula I can be prepared, for example, by the reaction of 2,5-dimercaptomethyl-1,4-dithiane with sulfur in the presence of basic catalyst, as known in the art.

The nature of the SH group in polythiols is such that oxidative coupling can occur readily, leading to formation of disulfide linkages (that is, —S—S— linkages). Various oxidizing agents can lead to such oxidative coupling. The oxygen in the air can in some cases lead to such oxidative coupling during storage of the polythiol. It is believed that a possible mechanism for the oxidative coupling of thiol groups involves the formation of thiyl radicals, followed by coupling of said thiyl radicals, to form disulfide linkage. It is further believed that formation of a disulfide linkage can occur under conditions that can lead to the formation of a thiyl radical, including but not limited to reaction conditions involving free radical initiation. The polythiols for use as compound (a) in the preparation of the polythiols of the present invention can include species containing disulfide linkages formed during storage.

The polythiols for use as compound (a) in the preparation of the oligomeric polythiols used in certain embodiments of the present invention also can include species containing disulfide linkages formed during synthesis of the polythiol.

In certain embodiments, the dithiol for use in the present invention can include at least one dithiol represented by the following graphic formulas:

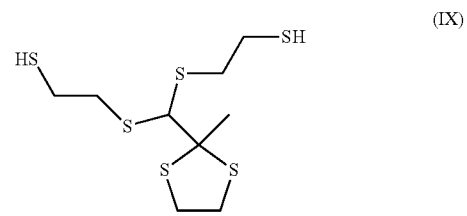

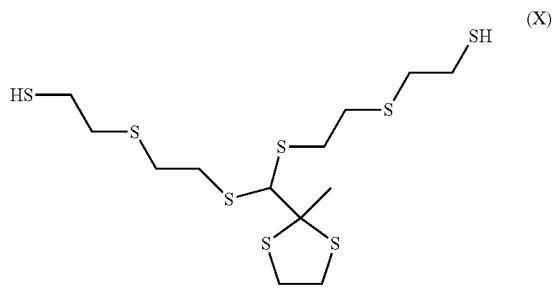

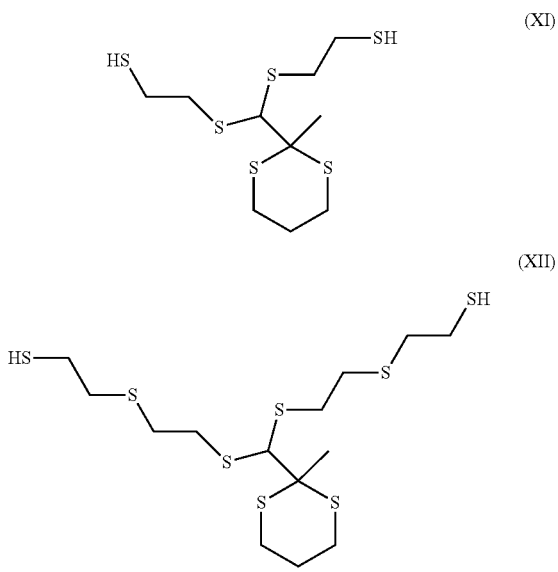

The sulfide-containing dithiols comprising 1,3-dithiolane (e.g., formulas IX and X) or 1,3-dithiane (e.g., formulas XI and XII) can be prepared by reacting asym-dichloroacetone with dimercaptan, and then reacting the reaction product with dimercaptoalkylsulfide, dimercaptan or mixtures thereof, as described in U.S. Pat. No. 7,009,032 B2.

Non-limiting examples of suitable dimercaptans for use in the reaction with asym-dichloroacetone can include but are not limited to materials represented by the following formula XIII:

(XIII)

wherein Y can represent $CH_2$ or $(CH_2\text{—}S\text{—}CH_2)$, and n' can be an integer from 0 to 5. The dimercaptan for reaction with asym-dichloroacetone in the present invention can be chosen from, for example, ethanedithiol, propanedithiol, and mixtures thereof.

The amount of asym-dichloroacetone and dimercaptan suitable for carrying out the above reaction can vary. For example, asym-dichloroacetone and dimercaptan can be present in the reaction mixture in an amount such that the molar ratio of dichloroacetone to dimercaptan can be from 1:1 to 1:10.

Suitable temperatures for reacting asym-dichloroacetone with dimercaptan can vary, often ranging from 0 to 100° C.

Non-limiting examples of suitable dimercaptans for use in the reaction with the reaction product of the asym-dichloroacetone and dimercaptan can include but are not limited to materials represented by the above general formula VI, aromatic dimercaptans, cycloalkyl dimercaptans, heterocyclic dimercaptans, branched dimercaptans, and mixtures thereof.

Non-limiting examples of suitable dimercaptoalkylsulfides for use in the reaction with the reaction product of the asym-dichloroacetone and dimercaptan include but are not limited to materials represented by the following formula:

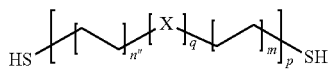

(XIV)

wherein X can represent O, S or Se, n" can be an integer from 0 to 10, m can be an integer from 0 to 10, p can be an integer from 1 to 10, q can be an integer from 0 to 3, and with the proviso that (m+n") is an integer from 1 to 20.

Non-limiting examples of suitable dimercaptoalkylsulfides for use in the present invention can include branched dimercaptoalkylsulfides.

The amount of dimercaptan, dimercaptoalkylsulfide, or mixtures thereof, suitable for reacting with the reaction product of asym-dichloroacetone and dimercaptan, can vary. Typically, dimercaptan, dimercaptoalkylsulfide, or a mixture thereof, can be present in the reaction mixture in an amount such that the equivalent ratio of reaction product to dimercaptan, dimercaptoalkylsulfide, or a mixture thereof, can be from 1:1.01 to 1:2. Moreover, suitable temperatures for carrying out this reaction can vary within the range of from 0 to 100° C.

The reaction of asym-dichloroacetone with dimercaptan can be carried out in the presence of an acid catalyst. The acid catalyst can be selected from a wide variety known in the art, such as but not limited to Lewis acids and Bronsted acids. Non-limiting examples of suitable acid catalysts can include those described in Ullmann's Encyclopedia of Industrial Chemistry, $5^{th}$ Edition, 1992, Volume A21, pp. 673 to 674. The acid catalyst is often chosen from boron trifluoride etherate, hydrogen chloride, toluenesulfonic acid, and mixtures thereof. The amount of acid catalyst can vary from 0.01 to 10 percent by weight of the reaction mixture.

The reaction product of asym-dichloroacetone and dimercaptan can alternatively be reacted with dimercaptoalkylsulfide, dimercaptan or mixtures thereof, in the presence of a base. The base can be selected from a wide variety known in the art, such as but not limited to Lewis bases and Bronsted bases. Non-limiting examples of suitable bases can include those described in Ullmann's Encyclopedia of Industrial Chemistry, $5^{th}$ Edition, 1992, Volume A21, pp. 673 to 674. The base is often sodium hydroxide. The amount of base can vary. Typically, a suitable equivalent ratio of base to reaction product of the first reaction, can be from 1:1 to 10:1.

The reaction of asym-dichloroacetone with dimercaptan can be carried out in the presence of a solvent. The solvent can be selected from but is not limited to organic solvents. Non-limiting examples of suitable solvents can include but are not limited to chloroform, dichloromethane, 1,2-dichloroethane, diethyl ether, benzene, toluene, acetic acid and mixtures thereof.

In another embodiment, the reaction product of asym-dichloroacetone and dimercaptan can be reacted with dimercaptoalkylsulfide, dimercaptan or mixtures thereof, in the presence of a solvent, wherein the solvent can be selected from but is not limited to organic solvents. Non-limiting examples of suitable organic solvents can include alcohols such as but not limited to methanol, ethanol and propanol; aromatic hydrocarbon solvents such as but not limited to benzene, toluene, xylene; ketones such as but not limited to methyl ethyl ketone; water; and mixtures thereof.

The amount of solvent can widely vary, from 0 to 99 percent by weight of the reaction mixtures. Alternatively, the reactions can be carried out neat, i.e., without solvent.

The reaction of asym-dichloroacetone with dimercaptan can also be carried out in the presence of a dehydrating reagent. The dehydrating reagent can be selected from a wide variety known in the art. Suitable dehydrating reagents for use in this reaction can include but are not limited to magnesium sulfate. The amount of dehydrating reagent can vary widely according to the stoichiometry of the dehydrating reaction.

The compound (a) having at least two thiol functional groups used to prepare the oligomeric polythiol used in certain embodiments of the present invention can be prepared in certain non-limiting embodiments by reacting 2-methyl-2-dichloromethyl-1,3-dithiolane with dimercaptodiethylsulfide to produce dimercapto-1,3-dithiolane derivative of formula III. Alternatively, 2-methyl-2-dichloromethyl-1,3-dithiolane can be reacted with 1,2-ethanedithiol to produce dimercapto-1,3-dithiolane derivative of formula II. 2-methyl-2-dichloromethyl-1,3-dithiane can be reacted with dimercaptodiethylsulfide to produce dimercapto-1,3-dithiane derivative of formula V. Also, 2-methyl-2-dichloromethyl-1,3-dithiane can be reacted with 1,2-ethanedithiol to produce dimercapto-1,3-dithiane derivative of formula IV.

Another non-limiting example of a dithiol suitable for use as compound (a) in the preparation of the oligomeric polythiol used in certain embodiments of the present invention can include at least one dithiol oligomer prepared by reacting dichloro derivative with dimercaptoalkylsulfide as follows in Reaction Scheme A:

Reaction Scheme A

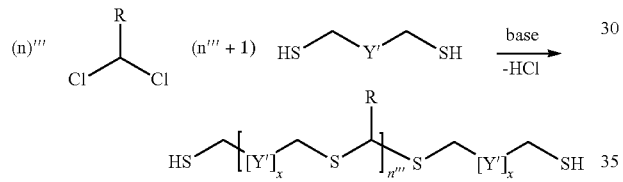

wherein R can represent $CH_3$, $CH_3CO$, $C_1$ to $C_{10}$ alkyl, cycloalkyl, aryl alkyl, or alkyl-CO; Y' can represent $C_1$ to $C_{10}$ alkyl, cycloalkyl, $C_6$ to $C_{14}$ aryl, $(CH_2)_{p'}(S)_{m'}(CH_2)_{q'}$, $(CH_2)_{p'}(Se)_{m'}(CH_2)_{q'}$, $(CH_2)_{p'}(Te)_{m'}(CH_2)_{q'}$, wherein m' can be an integer from 1 to 5 and, p' and q' can each be an integer from 1 to 10; n''' can be an integer from 1 to 20; and x can be an integer from 0 to 10.

The reaction of dichloro derivative with dimercaptoalkylsulfide can be carried out in the presence of a base. Suitable bases include any known to those skilled in the art in addition to those disclosed above.

The reaction of dichloro derivative with dimercaptoalkylsulfide may be carried out in the presence of a phase transfer catalyst. Suitable phase transfer catalysts for use in the present invention are known and varied. Non-limiting examples can include but are not limited to tetraalkylammonium salts and tetraalkylphosphonium salts. This reaction is often carried out in the presence of tetrabutylphosphonium bromide as phase transfer catalyst. The amount of phase transfer catalyst can vary widely, from 0 to 50 equivalent percent, or from 0 to 10 equivalent percent, or from 0 to 5 equivalent percent, relative to the dimercaptosulfide reactants.

The compound (a) having at least two thiol functional groups may further contain hydroxyl functionality. Non-limiting examples of suitable polythiol materials having hydroxyl groups can include but are not limited to glycerin bis(2-mercaptoacetate), glycerin bis(3-mercaptopropionate), 1,3-dimercapto-2-propanol, 2,3-dimercapto-1-propanol, trimethylolpropane bis(2-mercaptoacetate), trimethylolpropane bis(3-mercaptopropionate), pentaerythritol bis(2-mercaptoacetate), pentaerythritol tris(2-mercaptoacetate), pentaerythritol bis(3-mercaptopropionate), pentaerythritol tris(3-mercaptopropionate), and mixtures thereof.

In addition to dithiols disclosed above, particular examples of suitable dithiols for use as or in preparing the compound (a) can include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide (DMDS), methyl-substituted dimercaptodiethylsulfide, dimethyl-substituted dimercaptodiethylsulfide, 3,6-dioxa-1,8-octanedithiol, 1,5-dimercapto-3-oxapentane, 2,5-dimercaptomethyl-1,4-dithiane (DMMD), ethylene glycol di(2-mercaptoacetate), ethylene glycol di(3-mercaptopropionate), and mixtures thereof.

Suitable trifunctional or higher-functional polythiols for use in compound (a) can be selected from a wide variety known in the art. Non-limiting examples can include pentaerythritol tetrakis(2-mercaptoacetate), pentaerythritol tetrakis(3-mercaptopropionate), trimethylolpropane tris(2-mercaptoacetate), trimethylolpropane tris(3-mercaptopropionate), and/or thioglycerol bis(2-mercaptoacetate).

For example, the polythiol can be chosen from materials represented by the following formula XV,

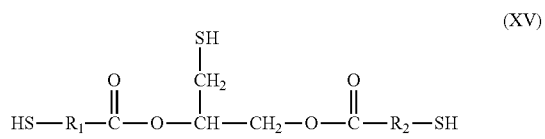

wherein $R_1$ and $R_2$ can each be independently chosen from straight or branched chain alkylene, cyclic alkylene, phenylene and $C_1$-$C_9$ alkyl substituted phenylene. Non-limiting examples of straight or branched chain alkylene can include but are not limited to methylene, ethylene, 1,3-propylene, 1,2-propylene, 1,4-butylene, 1,2-butylene, pentylene, hexylene, heptylene, octylene, nonylene, decylene, undecylene, octadecylene and icosylene. Non-limiting examples of cyclic alkylenes can include but are not limited to cyclopentylene, cyclohexylene, cycloheptylene, cyclooctylene, and alkyl-substituted derivatives thereof. The divalent linking groups $R_1$ and $R_2$ can be chosen from methylene, ethylene, phenylene, and alkyl-substituted phenylene, such as methyl, ethyl, propyl, isopropyl and nonyl substituted phenylene.

In particular embodiments, the compound (a) having at least two thiol functional groups may be prepared by reacting together (1) any of the dithiols mentioned above, and (2) a compound having at least two double bonds (for example, a diene). Such compounds having at least two double bonds are described in more detail below, as are reaction methods.

The compound (b) having triple bond functionality used to prepare the oligomeric polythiol used in the present invention may comprise any alkyne known to those skilled in the art. In certain embodiments, the alkyne comprises a hydroxyl functional alkyne, such as any of those known in the art. Because a triple bond can react twice with a thiol functional group, for the purposes of the present invention, a triple bond is understood to be equal to two equivalents of a double bond when determining reaction stoichiometry.

Suitable non-limiting examples of hydroxyl functional compounds having triple bond functionality include propargyl alcohol, 2-butyne-1,4-diol, 3-butyne-2-ol, 3-hexyne-2,5-diol, and/or mixtures thereof. A portion of the hydroxyl functional groups on the compound (b) may be esterified. For example, a portion of the compound (b) may comprise an alkyne-functional ester of a $C_1$-$C_{12}$ carboxylic acid such as propargyl acetate, propargyl propionate, propargyl benzoate, and the like.

In the preparation of the oligomeric polythiol used in certain embodiments of the present invention, the ratio of thiol functional groups in compound (a) to triple bonds in compound (b) typically ranges from 1.01:1 to 2.0:1, such as 1.5:1 to 2.0:1.

To prepare the oligomeric polythiols used in certain embodiments of the present invention, the reaction of the compound (a) with triple bond-containing compounds (b) can be carried out in the presence of radical initiator. Suitable radical initiators for use in the present invention can vary widely and can include those known to one of ordinary skill in the art. Non-limiting examples of radical initiators can include but are not limited to azo or peroxide type free-radical initiators such as azobisalkalenenitriles. The free-radical initiator can be azobisalkalenenitrile, which is commercially available from DuPont in their VAZO line. VAZO, VAZO-52, VAZO-64, VAZO-67, VAZO-88 and mixtures thereof can also be used as radical initiators, for example.

Selection of the free-radical initiator can depend on reaction temperature. The reaction temperature can vary, for example, from room temperature to 100° C. VAZO 52 can be used at a temperature of from 50-60° C. VAZO 64 and VAZO 67 can be used at a temperature of 60-70° C., and VAZO 88 can be used at a temperature of 70-100° C.

The amount of free radical initiator used in the reaction of the present invention can vary widely and can depend on the free radical initiator selected. Typically, the free radical initiator is present in an amount of from 0.01% by weight to 5% by weight of the reaction mixture.

The reaction of the compound (a) with the triple bond-containing compound (b) can be carried out under a variety of reaction conditions. Such conditions can depend on the degree of reactivity of the triple bond containing compound and the desired structure of the resulting polythiol oligomer. In one reaction scheme, the reactants and a radical initiator can be combined together while heating the mixture. Alternatively, the triple bond containing-compound can be added in relatively small amounts over a period of time to a mixture of polythiol and radical initiator at a certain temperature. Also, the triple bond containing-compound can be combined with the compound (a) having at least two thiol functional groups in a stepwise manner under radical initiation.

Certain embodiments of the present invention are further directed to use of a thioether-functional polythiol prepared by reacting together:

(a) a compound having at least two thiol functional groups as described above;

(b) a compound having triple bond functionality as described above; and (c) a compound having at least two double bonds.

In certain embodiments, the compound having triple bond functionality will be a hydroxyl functional compound, so the polythiol will have pendant hydroxyl functional groups.

The compound (a) having at least two thiol functional groups may be any thioether-functional, oligomeric polythiol, including those described above. In certain embodiments, the compound (a) comprises a reaction product of (1) any of the dithiols mentioned above, and (2) a compound having at least two double bonds, which may be the same as or different from the compound (c). The compound (b) having triple bond functionality can be any such compound, including those described above.

The compound (c) having at least two double bonds can be chosen from non-cyclic dienes, including but not limited to straight chain and/or branched aliphatic non-cyclic dienes, non-aromatic ring-containing dienes, including non-aromatic ring-containing dienes wherein the double bonds can be contained within the ring or not contained within the ring or any combination thereof, and wherein the non-aromatic ring-containing dienes can contain non-aromatic monocyclic groups or non-aromatic polycyclic groups or combinations thereof; aromatic ring-containing dienes; or heterocyclic ring-containing dienes; or dienes containing any combination of such non-cyclic and/or cyclic groups. The dienes can optionally contain thioether, disulfide, polysulfide, sulfone, ester, thioester, carbonate, thiocarbonate, urethane, or thiourethane linkages, or halogen substituents, or combinations thereof; with the proviso that the dienes contain at least some double bonds capable of undergoing reaction with SH groups of a polythiol, and forming covalent C—S bonds. In certain embodiments the compound (c) having at least two double bonds comprises a mixture of dienes that are different from one another.

The compound (c) having at least two double bonds may comprise acyclic non-conjugated dienes, acyclic polyvinyl ethers, allyl-(meth)acrylates vinyl-(meth)acrylates, di(meth)acrylate esters of diols, di(meth)acrylate esters of dithiols, di(meth)acrylate esters of poly(alkyleneglycol) diols, monocyclic non-aromatic dienes, polycyclic non-aromatic dienes, aromatic ring-containing dienes, diallyl esters of aromatic ring dicarboxylic acids, divinyl esters of aromatic ring dicarboxylic acids, and/or mixtures thereof.

Non-limiting examples of acyclic non-conjugated dienes can include those represented by the following formula XVI:

(XVI)

wherein $R_3$ can represent $C_1$ to $C_{30}$ linear or branched divalent saturated alkylene radical, or $C_2$ to $C_{30}$ divalent organic radical including groups such as but not limited to those containing ether, thioether, ester, thioester, ketone, polysulfide, sulfone and combinations thereof. The acyclic non-conjugated dienes can be selected from 1,5-hexadiene, 1,6-heptadiene, 1,7-octadiene and mixtures thereof.

Non-limiting examples of suitable acyclic polyvinyl ethers can include those represented by the following formula XVII:

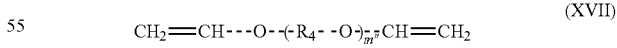

(XVII)

wherein $R_4$ can be $C_2$ to $C_6$ n-alkylene, $C_3$ to $C_6$ branched alkylene group, or —[(CH$_2$—)$_{p''}$—O—]$_{q''}$—(—CH$_2$—)$_{r'}$—, m" can be a rational number from 0 to 10, often 2; p" can be an integer from 2 to 6, q" can be an integer from 1 to 5 and r' can be an integer from 2 to 10.

Non-limiting examples of polyvinyl ether monomers suitable for use can include but are not limited to divinyl ether monomers, such as ethylene glycol divinyl ether, diethylene glycol divinyl ether, triethyleneglycol divinyl ether, and mixtures thereof.

Di(meth)acrylate esters of linear diols can include but are not limited to ethanediol di(meth)acrylate, 1,3-propanediol dimethacrylate, 1,2-propanediol di(meth)acrylate, 1,4-butanediol di(meth)acrylate, 1,3-butanediol di(meth)acrylate, 1,2-butanediol di(meth)acrylate, and mixtures thereof.

Di(meth)acrylate esters of dithiols can include but are not limited to di(meth)acrylate of 1,2-ethanedithiol including oligomers thereof, di(meth)acrylate of dimercaptodiethyl sulfide (2,2'-thioethanedithiol di(meth)acrylate) including oligomers thereof, di(meth)acrylate of 3,6-dioxa-1,8-octanedithiol including oligomers thereof, di(meth)acrylate of 2-mercaptoethyl ether including oligomers thereof, di(meth)acrylate of 4,4'-thiodibenzenethiol, and mixtures thereof.

Further non-limiting examples of suitable dienes can include but are not limited to monocyclic aliphatic dienes such as those represented by following graphic formula XVIII:

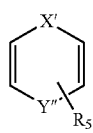

(XVIII)

wherein X' and Y" each independently can represent $C_{1-10}$ divalent saturated alkylene radical; or $C_{1-5}$ divalent saturated alkylene radical, containing at least one element selected from the group of sulfur, oxygen and silicon in addition to the carbon and hydrogen atoms; and $R_5$ can represent H, or $C_1$-$C_{10}$ alkyl; and those represented by the following graphic formula XIX:

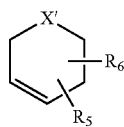

(XIX)

wherein X' and $R_5$ can be as defined above and $R_6$ can represent $C_2$-$C_{10}$ alkenyl. The monocyclic aliphatic dienes can include 1,4-cyclohexadiene, 4-vinyl-1-cyclohexene, dipentene and terpinene.

Non-limiting examples of polycyclic aliphatic dienes can include 5-vinyl-2-norbornene; 2,5-norbornadiene; dicyclopentadiene and mixtures thereof.

Non-limiting examples of aromatic ring-containing dienes can include but are not limited to those represented by the following graphic formula XX:

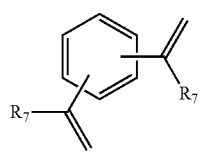

(XX)

wherein $R_7$ can represent hydrogen or methyl. Aromatic ring-containing dienes can include monomers such as diisopropenyl benzene, divinyl benzene and mixtures thereof.

Examples of diallyl esters of aromatic ring dicarboxylic acids can include but are not limited to those represented by the following graphic formula XXI:

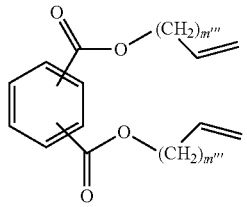

(XXI)

wherein each m'" independently can be an integer from 0 to 5. The diallyl esters of aromatic ring dicarboxylic acids can include o-diallyl phthalate, m-diallyl phthalate, p-diallyl phthalate and mixtures thereof.

In certain embodiments, the compound (c) having at least two double bonds comprises 5-vinyl-2-norbornene, ethylene glycol divinyl ether, diethylene glycol divinyl ether, triethylene glycol divinyl ether, butane diol divinyl ether, vinylcyclohexene, 4-vinyl-1-cyclohexene, dipentene, terpinene, dicyclopentadiene, cyclododecadiene, cyclooctadiene, 2-cyclopenten-1-yl-ether, 2,5-norbornadiene, divinylbenzene including but not limited to 1,3-divinylbenzene, 1,2-divinylbenzene, and/or 1,4-divinylbenzene, diisopropenylbenzene including but not limited to 1,3-diisopropenylbenzene, 1,2-diisopropenylbenzene, and/or 1,4-diisopropenylbenzene, allyl (meth)acrylate, ethanediol di(meth)acrylate, 1,3-propanediol di(meth)acrylate, 1,2-propanediol di(meth)acrylate, 1,3-butanediol di(meth)acrylate, 1,2-butanediol di(meth)acrylate, ethylene glycol di(meth)acrylate, diethylene glycol di(meth)acrylate, dimercaptodiethylsulfide di(meth)acrylate, 1,2-ethanedithiol di(meth)acrylate, and/or mixtures thereof.

Other non-limiting examples of suitable di(meth)acrylate monomers can include ethylene glycol di(meth)acrylate, 1,3-butylene glycol di(meth)acrylate, 1,4-butanediol di(meth)acrylate, 2,3-dimethyl-1,3-propanediol di(meth)acrylate, 1,6-hexanediol di(meth)acrylate, propylene glycol di(meth)acrylate, dipropylene glycol di(meth)acrylate, tripropylene glycol di(meth)acrylate, tetrapropylene glycol di(meth)acrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, polyethylene glycol di(meth)acrylate, thiodiethyleneglycol di(meth)acrylate, trimethylene glycol di(meth)acrylate, triethylene glycol di(meth)acrylate, alkoxylated hexanediol di(meth)acrylate, alkoxylated neopentyl glycol di(meth)acrylate, pentanediol di(meth)acrylate, cyclohexane dimethanol di(meth)acrylate, and ethoxylated bis-phenol A di(meth)acrylate and/or mixtures thereof.

In the preparation of the oligomeric polythiol used in certain embodiments of the present invention, the reactants (a), (b), and (c) may all be reacted together simultaneously (as in a "one pot" process) or mixed together incrementally in various combinations. For example, compound (a) may be reacted first with the compound (b) having triple bond functionality as discussed above in a first reaction vessel to produce a first reaction product, followed by addition of the compound (c) having at least two double bonds to the reaction mixture to react with the first reaction product and yield the oligomeric polythiol of the present invention (or addition of the first reaction product to a second reaction vessel containing the compound (c)). As an alternative, the compound (a)

may be reacted first with the compound (c) having at least two double bonds to produce a first reaction product, followed by addition of the compound (b) to yield the oligomeric polythiol. In this embodiment, one may optionally add, simultaneously with or after compound (b), an additional compound (c) having at least two double bonds, which may be the same as or different from that reacted earlier with compound (a) to form the first reaction product.

When the compound (a) is combined first with the compound (c), it is believed that they react via a thiol-ene type reaction of the SH groups of (a) with double bond groups of (c) although the inventors do not wish to be bound by this mechanism. Such reactions may typically take place in the presence of a radical initiator as mentioned above, or in the presence of a base catalyst, particularly when the compound (c) comprises a compound having at least one (meth)acrylate type double bonds. Suitable base catalysts for use in this reaction can vary widely and can be selected from those known in the art. Non-limiting examples can include tertiary amine bases such as 1,8-diazabicyclo[5.4.0]undec-7-ene (DBU) and N,N-dimethylbenzylamine. The amount of base catalyst used can vary widely, but typically it is present in an amount of from 0.001 to 5.0% by weight of the mixture of (a) and (c).

In certain embodiments, the thioether functional polythiol is oligomeric. As used herein, the terms "oligomer" and "oligomeric" and the like are intended to refer to compounds prepared by addition polymerization to yield a material having repeating units and having a number average molecular weight (Mn) up to 5000, such as up to 2000, such as 200 to 1200. The number average molecular weight may be determined by gel permeation chromatography using a polystyrene standard.

The stoichiometric ratio of the sum of the number of thiol equivalents of all polythiols present (compound (a)) to the sum of the number of equivalents of all double bonds present (including alkyne functionality effective as two double bond equivalents as discussed above) is greater than 1:1. In non-limiting embodiments, this ratio can be within the range of from greater than 1:1 to 3:1, or from 1.01:1 to 3:1, or from 1.01:1 to 2:1, or from 1.05:1 to 2:1, or from 1.1:1 to 1.5:1, or from 1.25:1 to 1.5:1. Any endpoints within these ranges can also be combined.

Various methods of reacting polyvinyl ether monomers and one or more dithiol materials are described in detail in U.S. Pat. No. 6,509,418B1, column 4, line 52 through column 8, line 25, which disclosure is herein incorporated by reference. Various methods of reacting allyl sulfide and dimercaptodiethylsulfide are described in detail in WO 03/042270, page 2, line 16 to page 10, line 7, which disclosure is incorporated herein by reference. Various methods for reacting a dithiol and an aliphatic, ring-containing non-conjugated diene in the presence of free radical initiator are described in detail in WO/01/66623A1, from page 3, line 19 to page 6, line 11, the disclosure of which is incorporated herein by reference.

In reacting the compounds (a) and (c), it may be advantageous to use one or more free radical initiators. Non-limiting examples of suitable free radical initiators can include azo compounds, such as azobis-nitrile compounds such as but not limited to azo(bis)isobutyronitrile (AIBN); organic peroxides such as but not limited to benzoyl peroxide and t-butyl peroxide; inorganic peroxides and similar free-radical generators.

Alternately, the reaction of compounds (a) and (c) can be effected by irradiation with ultraviolet light either with or without a photoinitiating moiety.

The mixture of (a) and (c) can be reacted for a time period of from 1 hour to 5 days and at a temperature of from 20° C. to 100° C. Often, the mixture is heated until a predetermined theoretical value for SH content is achieved.

The stoichiometric ratio of the sum of the number of equivalents of triple bond functional groups in compound (b) to the sum of the number of equivalents of double bonds in compound (c) is often within the range of from 0.01:0.99 to 1.00:0, or from 0.10:0.90 to 1.00:0, or from 0.20:0.80 to 1.00:0. Any endpoints within these ranges can also be combined.

As noted above the present sulfur-containing compounds can comprise a polythioether or a polymer comprising at least one polythioether linkage; that is, —[—$CH_2$—S—$CH_2$—]—. Typical polythioethers have from 8 to 200 of these linkages. Polythioethers suitable for use in the present invention include but are not limited to those described in U.S. Pat. Nos. 6,372,849, 6,172,179, and 5,912,319, incorporated by reference herein. Suitable polythioethers typically have a number average molecular weight of 150 to 10,000, such as 1,000 to 10,000, 2,000 to 5,000 or 3,000 to 4,000. Any endpoints within these ranges can also be combined. In some embodiments, the polythioether component will be terminated with non-reactive groups, such as alkyl, and in other embodiments will contain reactive groups in terminal or pendant positions. Typical reactive groups are thiol, hydroxyl, amino, vinyl, and epoxy. For a polythioether component that contains reactive functional groups, the average functionality typically ranges from 2.05 to 3.0, such as from 2.1 to 2.6. A specific average functionality can be achieved by suitable selection of reactive ingredients. Examples of suitable polythioethers are available from PRC-DeSoto International, Inc., in their PERMAPOL line, such as PERMAPOL P-3.1e and PERMAPOL P-3.

In certain embodiments, the sulfur-containing compound is dimercaptodioxaoctane ("DMDO"), and in certain specific embodiments the sulfur-containing compound is a trimer of DMDO. The trimer can be prepared as described in the examples below. In yet other embodiments, the sulfur-containing compound is a dimercaptan terminated polythioether, such as those described in U.S. patent application Ser. No. 11/260,553, incorporated by reference herein.

The sulfur-containing compound in the present invention can also comprise a polysulfide. A polysulfide is a polymer that contains multiple sulfur-sulfur linkages; that is, —[S—S]—, in the polymer backbone and/or in terminal or pendant positions on the polymer chain. In certain embodiments, the polysulfide polymers used according to the present invention have two or more sulfur-sulfur linkages. Suitable polysulfides are commercially available from AKZO Nobel under the name THIOPLAST and from Toray Chemicals under the name THIOKEL. These products are available in a wide range of molecular weights ranging, for example, from less than 1100 to over 8000, with molecular weight being the average molecular weight in grams per mole. Particularly suitable is a number average molecular weight of 1000 to 4000. The crosslink density of these products also varies, depending on the amount of crosslinking agent used. The mercaptan content, that is the "SH" content, of these products can also vary. In some embodiments, it may be desired to use a combination of polysulfides to achieve the desired molecular weight and/or crosslink density in the present compositions. Different molecular weights and/or crosslink densities can contribute different characteristics to the composition. For example, compositions wherein the sulfur-containing compound comprises more than one polysulfide polymer, and one of the polysulfide polymers has a molecular weight of approximately 1000, may have desirable non-crystallization properties.

In certain embodiments, the sulfur-containing compound is in the form of a prepolymer. Such prepolymers can be prepared, for example, by reacting a thiol with a compound comprising isocyanate functionality; the thiol can have one or more thiol groups and can further comprise one or more disulfide linkages. Such prepolymers can be added to the isocyanate component and/or the amine component.

When the second or amine component used in the formation of the present compositions comprises a sulfur-containing compound, the relative amount of the amine portion and the sulfur-containing compound portion can vary depending on the needs of the user. For example, the ratio of amine to sulfur-containing compound can vary from 1:99 to 99:1, and the amine component can comprise ≥20 weight percent, ≥30 weight percent, or ≥35 weight percent sulfur-containing compound, with weight percent based on the total weight of the amine component.

In an embodiment, the coating compositions of the present invention may further include polyurethane and/or poly(thio)urethane. It will be appreciated by those skilled in the art that polyurethane and/or poly(thio)urethane can be formed as a by-product in the reactions of the present invention. In alternate embodiments, the polyurethane and/or poly(thio)urethane can be formed in-situ and/or it can be added to the reaction mixture; a non-limiting example is an NCO functional prepolymer formed by reaction of a polyol and a polyisocyanate as disclosed herein. A non-limiting example of polyurethane formed in-situ may include the reaction product of polyisocyanate and hydroxyl-functional material, and a non-limiting example of poly(thio)urethane formed in-situ may include the reaction product of polyisocyanate and polythioether or other sulfur-containing compound. Non-limiting examples of suitable polyisocyanates may include those described herein. Non-limiting examples of suitable hydroxyl-functional material may include polyols such as those described herein. Non-limiting examples of sulfur-containing compounds may include those described herein. Another example of polyurethane/poly(thio)urethane formed in-situ may include the reaction product of hydroxyl functional prepolymer/thiol functional prepolymer and isocyanate-functional material. Suitable examples of these reactants may include those described herein.

The polyurea/polythiourea coating composition of the present invention may be formulated and applied using various techniques known in the art. Accordingly, the present invention is further directed to methods for coating a substrate comprising applying to at least a portion of the substrate any of the coating compositions described herein. In an embodiment, conventional spraying techniques may be used. In this embodiment, the isocyanate component and amine component may be combined such that the ratio of equivalents of isocyanate groups to equivalents of amine/thiol groups is greater than 1 and the isocyanate component and the amine component can be applied to a substrate at a volume mixing ratio of 1:1; the reaction mixture may be applied to an uncoated or coated substrate to form a first coating on the uncoated substrate or a subsequent coating on the coated substrate. When determining the ratio of equivalents of isocyanate groups to equivalents of reactive amine/thiol groups, the total amine/thiol groups are taken into consideration; that is the amine groups from any amine or amines used in the coating, and the thiol groups from any sulfur-containing compound used in the coating.

It will be appreciated that the present compositions are two component or "2K" compositions, wherein the isocyanate component and the amine component are kept separate until just prior to application. Such compositions will be understood as curing under ambient conditions, although a heated forced air or a heat cure can be applied to accelerate final cure or to enhance coating properties such as adhesion. In an embodiment, the sprayable coating composition may be prepared using a two-component mixing device. In this embodiment, isocyanate component and amine component are added to a high pressure impingement mixing device. The isocyanate component is added to the "A-side" and amine component is added to the "B-side". The A- and B-side streams are impinged upon each other and immediately sprayed onto at least a portion of an uncoated or coated substrate. The isocyanate and the amine or the amine and sulfur-containing compound react to produce a coating composition that is cured upon application to the uncoated or coated substrate. The A- and/or B-side can also be heated prior to application, such as to a temperature of 140° F. Heating may promote a better viscosity match between the two components and thus better mixing, but is not necessary for the curing reaction to occur.

It is believed that the ratio of equivalents of isocyanate groups to amine/thiol groups may be selected to control the rate of cure of the coating composition of the present invention. It has been found that cure and adhesion advantages may result when applying the coating in a 1:1 volume ratio wherein the ratio of the equivalents of isocyanate groups to amine/thiol groups (also known as the reaction index) is greater than one, such as from 1.01 to 1.10:1, or from 1.03 to 1.10:1, or from 1.05 to 1.08:1 or from 1.01 to 1.4 to 1 or from 1.01 to 1.5, or greater than 1.3 to 1. For example, good adhesion can be obtained using these ratios over clearcoats that have low surface functionality after cure, such as carbamate melamine, hydroxyl melamine, 2K urethane, and silane-containing clearcoats. The term "1:1 volume ratio" means that the volume ratio varies by up to 20% for each component, or up to 10% or up to 5%.

The rate of reaction of the thiol groups with the isocyanate can be altered depending on the type of amine or amines used. The amine co-reactant can function as a catalyst in the thiol/isocyanate reaction. While the inventors do not wish to be bound by any mechanism, it is believed that the greater the basicity of the amine, the faster the cure rate between the thiol and the isocyanate. Accordingly, the particular amine used and the amount of the amine used can be altered to adjust the cure rate of the overall composition. Alternatively, a catalyst can be used to increase the reaction rate. Suitable catalysts include, for example, DBU and other tertiary amines.

In a non-limiting embodiment, a commercially available mixing device available commercially under the designation GUSMER VR-H-3000 proportioner fitted with a GUSMER Model GX-7 spray gun may be used. In this device, pressurized streams of the A- and B-side components are delivered from two separate chambers and are impacted or impinged upon each other at high velocity to mix the two components and form a coating composition, which may be applied to an uncoated or coated substrate using the spray gun. The mixing forces experienced by the component streams may depend upon the volume of each stream entering the mixing chamber per unit time and the pressure at which the component streams are delivered. A 1:1 volume ratio of the isocyanate and amine/thiol per unit time may equalize these forces.

Another suitable application device known in the industry includes a "static mix tube" applicator. In this device, the isocyanate component and amine component are each stored in a separate chamber. As pressure is applied, each of the components is brought into a mixing tube in a 1:1 ratio by volume. Mixing of the components is effected by way of a torturous or cork screw pathway within the tube. The exit end of the tube may have atomization capability useful in spray application of the reaction mixture. Alternatively, the fluid reaction mixture may be applied to a substrate as a bead. A static mix tube applicator is commercially available from Cammda Corporation.

The polyurea/polythiourea coating compositions of the present invention may be applied to a wide variety of substrates. Accordingly, the present invention is further directed to a substrate coated with any of the composition described herein. Non-limiting examples of suitable substrates can include but are not limited to metal, natural and/or synthetic stone, ceramic, glass, brick, cement, concrete, cinderblock, wood and composites and laminates thereof; wallboard, drywall, sheetrock, cement board, plastic, paper, PVC, roofing materials such as shingles, roofing composites and laminates, and roofing drywall, styrofoam, plastic composites, acrylic composites, ballistic composites, asphalt, fiberglass, soil, gravel and the like. Metals can include but are not limited to aluminum, cold rolled steel, electrogalvanized steel, hot dipped galvanized steel, titanium and alloys; plastics can include but are not limited to TPO, SMC, TPU, polypropylene, polycarbonate, polyethylene, polyamides (Nylon). The substrates can be primed metal and/or plastic; that is, an organic or inorganic layer is applied thereto. Further, the coating compositions of the present invention can be applied to said substrates to impart one or more of a wide variety of properties such as but not limited to corrosion resistance, abrasion resistance, impact damage, flame and/or heat resistance, chemical resistance, UV light resistance, structural integrity, ballistic mitigation, blast mitigation, sound dampening, decoration and the like. In non-limiting examples, the coating compositions of the present invention can be applied to at least a portion of a building structure or an article of manufacture such as but not limited to a vehicle. "Vehicle" includes but is not limited to civilian, commercial, and military land-, water-, and air-vehicles, for example, cars, trucks, boats, ships, submarines, airplanes, helicopters, humvees and tanks. The article of manufacture can be a building structure. "Building structure" includes but is not limited to at least a portion of a structure including residential, commercial and military structures, for example, roofs, floors, support beams, walls and the like. As used herein, the term "substrate" may refer to a surface, either external or internal, on at least a portion of an article of manufacture or the article of manufacture itself. In an embodiment, the substrate is a truck bed.

In an embodiment, the polyurea/polythiourea coating composition of the present invention may be applied to a carrier film. The carrier film can be selected from a wide variety of such materials known in the art. Non-limiting examples of suitable carrier films may include, but are not limited to thermoplastic materials, thermosetting materials, metal foils, cellulosic paper, synthetic papers, and mixtures thereof. As used herein, the term "thermoplastic material" refers to any material that is capable of softening or fusing when heated and of solidifying (hardening) again when cooled. Non-limiting examples of suitable thermoplastic materials may include polyolefins, polyurethanes, polyesters, polyamides, polyureas, acrylics, and mixtures thereof. As used herein, the term "thermosetting material" refers to any material that becomes permanently rigid after being heated and/or cured. Non-limiting examples may include polyurethane polymers, polyester polymers, polyamide polymers, polyurea polymers, polycarbonate polymers, acrylic polymers, aminoplasts, isocyanates, epoxies, copolymers thereof, and mixtures thereof.

As noted above, in certain embodiments, the polyurea/polythiourea coating compositions of the present invention may be applied to a bare (e.g., untreated, uncoated) substrate, a pretreated substrate and/or coated substrate having at least one other coating. In a non-limiting embodiment, the coating compositions of the present invention may be applied as part of a multi-layer coating composite. The first coating applied to a substrate may be selected from a variety of coating compositions known in the art for surface coating substrates. Non-limiting examples may include but are not limited to electrodepositable film-forming compositions, primer compositions, pigmented or non-pigmented monocoat compositions, pigmented or non-pigmented base coat compositions, transparent topcoat compositions, industrial coating compositions, and the like. In another non-limiting embodiment, the coating compositions of the present invention may be applied as part of a multi-layer coating composite comprising a pretreated substrate and coating layers such as but not limited to electrocoat, primer, base coat, clear coat, and combinations thereof. In an embodiment, the clear coat comprises silane functional groups either before or after crosslinking and cure.

In a further embodiment, the polyurea/polythiourea coating compositions of the present invention can be used in a two-coat application resulting in a textured surface. A first coat is applied to an uncoated or coated substrate to produce a smooth, substantially tack-free layer. The "Tack-Free Method" is used to determine if the layer is substantially tack-free. The Tack-Free Method includes spraying the coating composition in one coat onto a non-adhering plastic sheet to a thickness of from 10 to 15 mil (254-381 microns). When spraying is complete, an operator, using a loose fitting, disposable vinyl glove, such as one commercially available as AMBIDEX Disposable Vinyl Glove by Marigold Industrial, Norcross Ga., gently touches the surface of the coating. The coating may be touched more than one time by using a different fingertip. When the glove tip no longer sticks to, or must be pulled from, the surface of the layer, the layer is said to be substantially tack-free. The time beginning from the completion of spraying until when the coating is substantially tack-free is said to be the tack time or tack-free time. In a non-limiting embodiment, the tack-free time and the cure time may be controlled by balancing levels of various composition components such as the amount and/or type of amine.

A second coat may then be applied to the first coating layer as a texturizing layer or "dust coating". The second coating layer can be applied by increasing the distance between the application/mixing device and the coated substrate to form discrete droplets of the coating composition prior to contacting the coated substrate thereby forming controlled non-uniformity in the surface of the second layer. The substantially tack-free first layer of the coating is at least partially resistant to the second layer; i.e., at least partially resistant to coalescence of the droplets of coating composition sprayed thereon as the second layer or dust coating such that the droplets adhere to but do not coalesce with the previous layer(s) to create surface texture. The final coating layer typically exhibits more surface texture than the first or previous coating layers. Alternatively, a textured surface may be achieved by injection during in-mold coating, or by spray coating the present composition and then rolling a texture onto its surface. An overall thickness of the coating layers may range from 20 to 1000 mils, or from 40 to 150 mils, or from 60 to 100 mils (1524-2540 microns), or from 500 to 750 mils. Any of the endpoints within these ranges can also be combined. In a non-limiting embodiment, the first layer may be the majority of the total thickness and the dust coating may be from 15-50 mils (381-1270 microns).

In various embodiments of the present invention, the "first" coating layer may comprise one, two, three or more layers; and the "second" coating layer may be one or more subsequent layers applied thereover. For example, four polyurea (or polyurea/polythiourea) layers may be applied, with the fourth layer being the dust coating and each layer having a thickness of from 15 to 25 mil (381-635 microns). It will be appreciated that these coating layers are relatively "thick". The coating compositions of the present invention can also be applied as much thinner layers as well, such as 0.1 to less the 15 mils, such as 0.1 to 10, 0.5 to 3 or 1 to 2 mils. Any of the endpoints within these ranges can also be combined. Such layers can be used alone or in conjunction with other coating layers, such as any of those known in the art or otherwise described herein. When applied at a sufficient thickness (e.g. 10 to 1000 mils, such as 100 to 200 mils, or 125 mils+/−10 mils), the present polyurea/polythiourea layer(s) can provide blast and/or ballistic mitigation. "Blast and/or ballistic mitigation" means, for example, protection in the event of a close proximity blast, projectile, or explosion. This protection can include, for example, protection of a structure or portion of a structure, such as a building structure, vehicle, aircraft, ship/boat, shipping container and the like, from collapse and/or destruction, protection against flying debris and blast fragments, gunshots and the like.

In alternate embodiments, the coating layers may comprise the same or different polyurea/polythiourea coating compositions. For example, the first layer may be a composition comprising aliphatic and/or aromatic amine components and/or aliphatic and/or aromatic polyisocyanate and the second layer may comprise the same or different combination of aliphatic and/or aromatic amine components and/or aliphatic and/or aromatic polyisocyanate. Either or both layers may further comprise any of the sulfur-containing compounds described herein. "Amine component" in this context means any amine used in the present coatings. In a further embodiment, the outermost coating layer may comprise a coating composition that provides a desired durability. The desired durability may depend upon the use of the coating composition of the present invention and/or the substrate to which it may be applied. In an embodiment, a combination of aliphatic and/or aromatic amine and/or polyisocyanate may be selected such that the composition of the outermost layer has substantial durability. For example, the outermost coating layer may have a durability of 1000 kJ to 6000 kJ, or from 800 hours to 4000 hours, when tested using a Weatherometer (Atlas Material Testing Solutions) in accordance with method SAE J1960. In this embodiment, the first layer may be a polyurea composition comprising polyisocyanate and amine, wherein at least one of the amine and/or polyisocyanate may comprise an aromatic moiety, and the second layer may be a polyurea composition comprising predominantly aliphatic amine and aliphatic polyisocyanate, with little or no aromaticity; again, either or both of the layers can further comprise any of the sulfur-containing compounds described herein.

The polyurea/polythiourea coating compositions of the present invention may optionally include materials standard in the art such as but not limited to fillers, fiberglass, stabilizers, thickeners, fillers, adhesion promoters, catalysts, colorants, antioxidants, UV absorbers, hindered amine light stabilizers, rheology modifiers, flow additives, anti-static agents and other performance or property modifiers that are well known in the art of surface coatings, and mixtures thereof. For example, the present coatings can further comprise flame and/or heat resistant material, such as any one or more of those disclosed in U.S. application Ser. No. 11/460,439, hereby incorporated by reference in its entirety. Fillers can include clay and/or silica, and adhesion promoters can include amine functional materials, aminosilanes and the like; examples of fillers and adhesion promoters are further described in U.S. Publication No. 2006/0046068 and U.S. application Ser. No. 11/591,312, hereby incorporated by reference in their entirety. These additives can be combined with the isocyanate component, the amine component, or both. In certain embodiments, the coating may further comprise small amounts of solvent and in certain embodiments the coating may be substantially solvent-free. "Substantially solvent-free" means that the coating may contain a small amount of solvent, such as 5%, 2%, 1% or less.

The coatings of the present invention can also include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

In another embodiment, the polyurea/polythiourea coating compositions of the present invention when applied to a substrate possesses color that matches the color of an associated substrate. As used herein, the term "matches" or like terms when referring to color matching means that the color of the coating composition of the present invention substantially corresponds to a desired color or the color of an associated substrate. For instance, when the substrate for the polyurea coating composition is a portion of a vehicle, such as a truck bed, the color of the coating substantially matches that of the associated vehicle body. This can be visually observed, or confirmed using spectroscopy equipment.

The coatings of the present invention may be part of a multi-layer coating composite comprising a substrate with various coating layers such as a pretreatment layer, electrocoat, primer, base coat and clear coat. At least one of the base coat and clear coat may contain pigment and/or the clear coat may contain an adhesion promoter and any of these coatings can be one or more of the coatings described herein. It is believed that the addition of adhesion promoter to the clear coat, or to its surface, may improve the adhesion between the clear coat and the coating composition applied thereover, although the inventors do not wish to be bound by any mechanism. In this embodiment, the coating composition of the present invention may be the reaction product of the isocyanate component and the amine component with a colorant additive. The coating composition of the present invention containing colorant may be applied to at least a portion of the article or structure. The color of the coated article or structure may match the color of an associated substrate. An "associated substrate" may refer to a substrate that comprises the article or structure but is not coated with the coating composition of the present invention or a substrate that is attached, connected or in close proximity to the article or structure, but is not coated with the coating composition of the present invention.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. "Including" and like terms are open ended; that is, they mean "including but not limited to". For example, while the invention has been described herein including the claims in terms of "a" polyurea/polythiourea, "an" isocyanate, "an" amine, "a" sulfur-containing compound, "a" polythiol, "a" polythioether, "a" polysulfide, "a" catalyst, and the like, mixtures of all of such things can be used. Also, as used herein, the term "polymer" is meant to refer to prepolymers, oligomers and both homopolymers and copolymers; the prefix "poly" refers to two or more.

EXAMPLES

The following examples are intended to illustrate the invention and should not be construed as limiting the invention in any way.

In the following examples, unless otherwise stated, the refractive index and Abbe number were measured on a multiple wavelength Abbe Refractometer Model DR-M2 manufactured by ATAGO Co., Ltd.; the refractive index and Abbe number of liquids were measured in accordance with ASTM-D1218; the refractive index and Abbe number of solids was measured in accordance with ASTM-D-542.

The viscosity was measured using a Brookfield CAP 2000+ Viscometer.

The SH equivalents were determined using the following procedure. A sample size (0.1 mg) of the product was combined with 50 mL of tetrahydrofuran (THF)/propylene glycol (80/20) and stirred at room temperature until the sample was substantially dissolved. While stirring, 25.0 mL of 0.1 N iodine solution (which was commercially obtained from Aldrich 31, 8898-1) was added to the mixture and then allowed to react for a time period of from 5 to 10 minutes. To this mixture was added 2.0 mL concentrated HCl. The mixture was then titrated potentiometrically with 0.1 N sodium thiosulfate in the millivolt (mV) mode. A blank value was initially obtained by titrating 25.0 mL iodine (including 1 mL of concentrated hydrochloric acid) with sodium thiosulfate in the same manner as conducted with the product sample.

$$\%SH = \frac{(mls\ \text{Blank} - mls\ \text{Sample}) \times (\text{Normality NA}_2\text{S}_2\text{O}_3) \times (3.307)}{\text{Sample weight, g}}$$

Example 1

Synthesis of 2/1 (mol/mol) Adduct of Dimercaptodiethylsulfide (DMDS) and Propargyl Alcohol(PA) (Polythiol H)

In a glass jar with magnetic stirrer were mixed DMDS from Nisso Maruzen, Japan, 154.0 g. (1.0 mol) and PA from Aldrich, 28.0 g. (0.5 mol) at room temperature. Then this mixture was heated up to 60° C. using an oil bath. The mixture was kept at this temperature while stirring for 30 min. An exothermic reaction started to take place, leading to an increase in the temperature of the reaction mixture to 80° C. for a short period of time. This exothermic reaction was over after 30 minutes and the reaction temperature went down to 60° C., the temperature of the heating bath. Radical initiator VAZO[1] 64, 50 mg., 275 ppm was added three times at intervals of 5 hours while the mixture was stirred at 60° C. The equivalent weight of the product was 181.5 g/equiv (theoretical 182 g/equiv), based on an Mn=363. VAZO 64, 50 mg., 275 ppm was added again and the mixture was heated at 60° C. upon stirring for another 5 hours. The equivalent weight measurement showed no changes and the reaction was considered completed. The viscosity of the materials was 258 cPs (25° C.), nD=1.627, Abbe 36, nE=1.631, Abbe 36. The yield was quantitative.

[1] Available from DuPont.

Example 2

Synthesis of 2/1 (mol/mol) Adduct of (DMDS) and 1,3-Diisopropenyl Benzene (DIPEB) (POLYTHIOL B)

524.6 g DMDS (3.4 mol) were charged to a glass jar, and the contents were heated to 60° C. To the jar was slowly added 269.0 g DIPEB (1.7 mol) with mixing. Once the addition of DIPEB was completed, the jar was placed in an oven heated to 60° C. for 2 hours. Afterwards, 0.1 g VAZO 52 was dissolved into the contents of the jar, and the jar was returned to the oven. After 20 hours, the resulting sample was titrated for —SH equivalents and was found to have an equivalent weight of 145 g/mol. 0.1 g VAZO 52 was dissolved into the reaction mixture, which was then returned to the oven. Over the course of 8 hours, two additions of 0.2 g VAZO 52 were made, and the reaction mixture kept in the 60° C. oven over that time frame. 17 hours after the final addition of VAZO 52 was made, the resulting sample was titrated to an equivalent weight of 238 g/equiv (theoretical 233 g/equivalent). The viscosity of the material at 25° C. was measured and found to be 490 cPs. The yield was quantitative.

Example 3

Synthesis of 2/1 (mol/mol) Adduct of POLYTHIOL B and PA (POLYTHIOL E)

Polythiol B (prepared according to Example 2) 200.0 g. (0.42 mol) and PA, 11.6 g. (0.21 mol) were mixed at room temperature. Then this mixture was heated up to 65° C. Radical initiator VAZO 52, 42 mg, 200 ppm was added three times at intervals of 5 hours while the mixture was stirred at 65° C. The SH equivalent weight was determined to be 499 g/equiv. The mixture was heated at 65° C. for another 5 hours and the SH equivalent weight was measured again, and determined to be 499 g/equiv, based on an Mn=998. The viscosity of the mixture was 463 cPs (73° C.), nD=1.620, Abbe 36, nE=1.624, Abbe 35. The yield was quantitative.

Example 4

Synthesis of 2/1 (mol/mol) Adduct of DMDS and 5-Vinyl-2-Norbornene (VNB) (POLYTHIOL V)

77 g DMDS (0.5 mol) was charged to a glass jar, and the contents were heated to 60° C. To this jar was slowly added 30 g VNB (0.25 mol) with mixing, while keeping the temperature of the mixture ~60° C. After completion of the addition the mixture was heated at 60° C. for another 30 min, then 0.2 g VAZO 67 was dissolved into the contents of the jar, and the jar was heated at 65° C. for 20 hours. The resulting product was analyzed for SH content by titration with iodine. An SH equivalent weight of 216 g/equiv (theoretical 214 g/equivalent) was calculated. The viscosity of the material at 25° C. was measured and found to be 460 cPs. The product obtained was a transparent colorless liquid, $n_D$=1.607, Abbe 39, $n_E$=1.610, Abbe 39. The yield was quantitative.

Example 5

Polythiol Blend

A polythiol blend was prepared by blending Polythiol B (prepared as described in Example 2) and Polythiol E (prepared as described in Example 3) in a ratio of 3/2 (w/w) by weight.

Example 6

Dimercaptodioxaoctane (DMDO) Trimer

A thiol functional resin was prepared as described below:

Triallylcyanurate acid (167.8 g) and DMDO (371.81 g) were combined and warmed to 65° C. and 0.1416 g of VAZO 67 added. The reaction was monitored hourly by measuring the thiol equivalent weight. VAZO 67 (approx 0.15 g) was added after each measurement until the thiol equivalent weight was greater than 250 meq/g. After the initial 2 hours the temperature was increased to 85° C., and after an additional 2 hours the reaction temperature was increased to 95° C. The reaction was monitored for a total of 8 hours. The final material had a measured solids content of 95% (1 hr, 110° C.), thiol equivalent weight of 257 meq/g and Mw of 5858 as measured by gel permeation chromatography. The DMDO trimer thus prepared can be incorporated into a coating according to the present invention by using the trimer in the amine component as generally taught herein. Alternatively the DMDO trimer can be formulated into a prepolymer and used in the isocyanate component.

Examples 7-12

An isocyanate-functional polythiourethane for use as the "A" side in Example 12 was prepared as described below A total of 193.6 grams of isophorone diisocyanate, 180 grams of THIOPLAST G4[2], and 136.8 grams of TERATHANE 650[3], were added to a suitable reaction vessel equipped with a stirrer, temperature probe, condenser and a nitrogen cap. The contents of the flask were mixed well. Then 0.3 grams of dibutyltin dilaurate were added to the mixture. The contents were slowly heated to 80° C. The contents underwent an exotherm to 112° C. The reaction was held at 100° C. for 2.5 hours. The isocyanate equivalent weight of the contents was then measured and found to be 537. The temperature of the reaction mixture was lowered to 80° C. Finally, 224 grams of DESMODUR[4] XP2580 and 225 grams of DESMODUR[5] XP2410 were added to the reaction mixture. The contents of the reactor were cooled and poured out. The final material had a measured solids of 96%, a viscosity of Z3, and an isocyanate equivalent weight of 266.

[2] Mercaptan-terminated poly-disulfide mixture, available from AKZO Nobel.
[3] Polytetramethylene ether glycol, available from Invista.
[4] An allophonate of hexamethylene diisocyanate, available from Bayer Material Science.
[5] An asymmetric trimer of hexamethylene diisocyanate, available from Bayer Material Science.

| Component | percent by weight |
|---|---|
| A-side For Example 12 | |
| IPDI | 16.05 |
| DBTDL | 0.003 |
| TERATHANE 650 | 11.35 |
| AKZO NOBEL G4 | 14.92 |
| DESMODUR XP2410 | 28.84 |
| DESMODUR XP2580 | 28.84 |

An isocyanate-functional polyurethane for use as the A side in Examples 7-11, was prepared as described below:

A total of 1348.9 grams of isophorone diisocyanate (IPDI) and 1901.5 grams of TERATHANE 650, were added to a suitable reaction vessel equipped with a stirrer, temperature probe, condenser and a nitrogen cap. The contents of the flask were mixed well. Then 0.2 grams of dibutyltin dilaurate (DBTDL) were added to the mixture. The contents were slowly heated to 80° C. The contents underwent an exotherm to 112° C. The reaction was held at 100° C. for 2.5 hours. The isocyanate equivalent weight of the contents was then measured and found to be 531. The temperature of the reaction mixture was lowered to 80° C. Finally, 2490.6 grams of DESMODUR XP2580 and 2490.6 grams of DESMODUR XP2410 were added to the reaction mixture. The contents of the reactor were cooled and poured out. The final material had a measured solids of 98%, a viscosity of Y, and an isocyanate equivalent weight of 255.8.

| Component | percent by weight |
|---|---|
| A-side For Examples 7-11 | |
| IPDI | 16.4 |
| DBTDL | 0.003 |
| TERATHANE 650 | 23.1 |
| DESMODUR XP2410 | 30.3 |
| DESMODUR XP2580 | 30.3 |

Pigment grinds were prepared according to the following table:

| Grind 1 | |
|---|---|
| Ingredient | Percent by Weight |
| JEFFAMINE T3000[6] | 24.0 |
| DESMOPHEN 1220 NH[7] | 22 |
| BYK-9077[8] | 0.6 |
| VULCAN XC72[9] | 1.2 |
| BENTONE 34[10] | 3 |

[6]Polyoxyalkylene primary amine of approximately 3000 MW, available from Huntsman Corporation.
[7]Amine-functional asparatic acid ester, available from Bayer Corporation.
[8]Additive, available from Byk-Chemie.
[9]Carbon black pigment, available from Cabot Corporation.
[10]Organoclay rheology additive, available from Elementis Specialities, Inc For Grind 1, the ingredients were combined and charged to a Model HM1.5VSD bead mill (Premier Mill Inc.) using with Mill Mates TZP Plus grind media (supplied by Zircoa Inc) at 85% mill loading and ground at a mill speed of 2400 rpm. The grinds were judged to be complete when the particle size was found to be 7.5 Hegman upon drawdown on a fineness of grind gauge.

The "B" side formulations were prepared as shown in the following table:

|  | percent by weight ||||||
|  | B-side ||||||
| Component | Ex. 7 | Ex. 8 | Ex. 9 | Ex. 10 | Ex. 11 | Ex. 12 |
| --- | --- | --- | --- | --- | --- | --- |
| GRIND 1 | 50.8 | 50.8 | 50.8 | 50.8 | 50.8 | 50.8 |
| JEFFAMINE T-3000 | 10 | — | — | — | — | — |
| JEFFLINK 754[11] | — | 29.7 | 17.5 | 23.1 | 19.7 | 29.2 |
| DESMOPHEN 1220 NH | 11 | 8 | 9 | 9 | 9 | 10 |
| DMDO (95%)[12] | — | — | — | 6 | — | — |
| POLYTHIOL H (from Example 1) | 17 | — | — | — | — | — |
| POLYTHIOL V (from Example 4) | — | 9 | — | — | — | — |
| POLYTHIOL B (from Example 2) | — | — | 20.2 | — | — | — |
| POLYTHIOL BLEND (from Example 5) | — | — | — | 14.60 | — | — |
| P3.1e[13] | — | — | — | — | 12 | — |
| CLEARLINK 1000[14] | 8.7 | — | — | — | — | — |
| CHISORB 353[15] | 2 | 2 | 2 | 2 | 2 | 2 |
| DABCO T-12 (dibutyl tin dilaurate) | 0.5 | 0.5 | 0.5 | 0.5 | 0.5 | 0.5 |
| ratio of equivalents (Index) of isocyanate to amine/thiol | 1.100 | 1.107 | 1.098 | 1.101 | 1.094 | 1.089 |

[11]Alicyclic secondary amine, available from Huntsman Corporation.
[12]Available from Sigma-Aldrich, Inc.
[13]Polythioether, available from PRC-DeSoto International, Inc.
[14]Aliphatic secondary amine, available from Dorf-Ketal Chemicals, LLC.
[15]Hindered amine light stabilizer, available from Chitec Chemical Corporation.

The B side formulations of the table above were made by taking Grind 1 and then blending in the balance of the other materials until well mixed. The B side formulations were charged into separate canisters and to be paired up with the A side formulation (in separate canisters) and heated to 140° F. in an oven for 2-6 hrs prior to spraying to ensure samples were equilibrated. Polyurea coating compositions were produced by mixing a 1:1 volume ratio of the A-side components to the B-side components in a static mix tube applicator device available from Cammda Corporation and sprayed onto panels.

Hardness values were determined by charging the A and B side components into a double-barreled syringe equipped with a static mix tube and a "Pneumatic applicator" (PC Cox Limited) and injecting the components at a 1:1 ratio into a mold to form a round "puck" of approximately 6 cm in diameter and 0.2 cm in thickness. The hardness of the polyurea coating puck at ambient temperature was measured on the Shore D scale with a Model 212 Pencil Style Digital Durometer (Pacific Transducer Corp.) The pucks were then placed in a 140° F. oven for 1 day and the Shore D hardness of the coating measured with the puck still inside the oven to prevent cooling. The pucks were removed from the oven and cooled to ambient temperature. The hardness was measured again on those pucks at ambient temperature after being out of the oven for 1 day.

The following table shows results of characterization of the resulting coatings:

|  | Ex 7 | Ex 8 | Ex 9 | Ex 10 | Ex 11 | Ex 12 |
| --- | --- | --- | --- | --- | --- | --- |
| Tack free time (sec) | 75 | 32 | 50 | 70 | 60 | 38 |
| Hardness (Shore D) @ ambient temperature, 1 day ambient cure | 55.2 | 68.3 | 53.8 | 64.2 | 59.2 | 64.2 |
| Hardness (Shore D) @ ambient temperature after 3 days ambient cure | — | — | — | — | 61.1 | 65.1 |
| Hardness (Shore D) @ ambient temperature after 4 days ambient cure | 51.5 | 67.6 | 43.6 | 61.2 | — | — |
| Hardness (Shore D) @ ambient temperature after 7 days ambient cure | 52.8 | 62.2 | 44.3 | 60.5 | 60.5 | 67.1 |
| Hardness (Shore D) after 7 days at ambient temperature plus 1 day at 140° F. measure @ 140° F. | 26.4 | 24.4 | 18.1 | 23.1 | 28.1 | 25.6 |
| Hardness (Shore D), 7 days at ambient plus 1 day at 140° F., after 1 day ambient (recovery) measured @ ambient | 36.2 | 55.6 | 35.8 | 47.4 | 55.4 | 65.4 |

Example 13

Synthesis of Mercaptan-Capped Polythioether

A 5 liter 4-neck flask was charged with 2254.49 g (12.37 moles) of dimercaptodioxaoctane (DMDO). The flask was flushed with nitrogen, the contents were heated to 60° C. and, under stirring, a solution of 1.61 g (0.008 mole) of radical initiator Vazo-67 [2,2'-azobis(2-methylbutyronitrile) in 1771.35 g (11.20 moles) of diethylene glycol divinyl ether (DEG-DVE) was added over a period of 5.5 hr while maintaining the temperature at 60-65° C. The mixture was then stirred at 70° C. for an additional 1.5 hr. To complete the reaction, nine portions of Vazo-67 (each 0.901 g, 0.0046 mole) were added at one-hour intervals while the temperature of the reaction mixture was maintained at 70° C. The contents were heated at 90° C. for 2 hr, cooled to 70° C. and evacuated at 10 mmHg for 1 hr to give a faint yellow, liquid polythioether (4025.84 g; Yield: 100%); having an equivalent weight of 1702 and a viscosity of 54 poise (measured at a temperature of about 25° C. and a pressure of about 760 mm Hg according to ASTM D-2849 §79-90 using a Brookfield CAP 2000 viscometer).

Example 14

Synthesis of Isocyanate-Capped Polythioether

A 5 liter 4-neck flask was charged with 1932.62 g (0.59 mole) of the mercaptan-capped polythioether of Example 13, the reaction flask was evacuated at 1 mmHg for 0.5 hr and vacuum was released under nitrogen. Rubinate 9433, (1210.44 g, 4.54 moles, modified diphenylmethane diisocyanate, a Huntsman International product) was added and mixed for 15 min. Polycat 8 (0.94 g, 0.008 mole, N,N-dimethylcyclohexylamine, a product of Air Products) was added as a base catalyst. A mild exotherm developed and raised the reaction temperature to 37° C. Without external heating, stirring was continued at 37-39° C. for 0.75 hr. Reaction mixture was heated at 39-50° C. for 2 hr. The mercaptan equivalent weight of the reaction mixture was 117,660 at this stage. The reaction mixture was evacuated at 46° C./10 mmHg for 1 hr. After releasing the vacuum under nitrogen, benzoyl chloride (1.26 g, 0.009 mole), a stabilizer, was added and stirred for 10 min. The reaction product was yellow in color; has an NCO equivalent weight of 415 and a viscosity of 148 poise (measured at a temperature of about 25° C. and a pressure of about 760 mm Hg according to ASTM D-2849 §79-90 using a Brookfield CAP 2000 viscometer).

Example 15

Synthesis of Amine-Capped Polythioether

A 3 liter 4-neck flask was charged with 1703.46 (1.47 moles) of Permapol® L-5534, an epoxy-capped polythioether commercially available from PRC-DeSoto International, Inc., and 628.52 (2.94 moles) of Ethacure 300, a diamine from Huntsman Inc. The contents were mixed under vacuum (10 mmHg) for 0.25 hr. Polycat 8 (0.47 g, 0.0037 mole) was added and the mixture was heated at 84-92° C. for 10 hr. The product was light brown in color and had a viscosity of 6 poise (measured at a temperature of about 25° C. and a pressure of about 760 mm Hg according to ASTM D-2849 §79-90 using a Brookfield CAP 2000 viscometer).

Whereas particular embodiments of this invention have been described above for purposes of illustration, it will be evident to those skilled in the art that numerous variations of the details of the present invention may be made without departing from the invention as defined in the appended claims.

Therefore, what is claimed is:

1. A coating composition comprising polyurea and polythiourea formed from a reaction mixture comprising:
   a first component comprising (i) an isocyanate selected from one or more of isophorone diisocyanate (IPDI), cyclohexylene diisocyanate, 4,4'-methylenedicyclohexyl diisocyanate ($H_{12}$MDI), tetramethylxylyl diisocyanate, OCN—C(CH$_3$)$_2$—C$_6$H$_4$C(CH$_3$)$_2$—NCO, 1,4-tetramethylene diisocyanate, 1,5-pentamethylene diisocyanate, 1,6-hexamethylene diisocyanate (HMDI), 1,7-heptamethylene diisocyanate, 2,2,4-trimethylhexamethylene diisocyanate, 2,4,4-trimethylhexamethylene diisocyanate, 1,10-decamethylene diisocyanate, 2-methyl-1,5-pentamethylene diisocyanate, phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate, alkylated benzene diisocyanates, methylenediphenyl diisocyanate, 3,3'-dimethyl-4,4'-diphenylmethane diisocyanate, the uretdione of 1,6-hexamethylene diisocyanate, the biuret of 1,6-hexanediisocyanate, the isocyanurate of 1,6-hexanediisocyanate, and the isocyanurate of isophorone diisocyanate; and (ii) an isocyanate functional compound comprising a polythioether-polyurethane and/or polythiourethane; wherein at least 1 percent by weight of the first component comprises at least one polyisocyanate monomer; and
   a second component comprising an amine and an amine/hydroxy functional polythioether that is different from the amine, wherein the amine/hydroxy functional polythioether comprises an amine-functional reaction product of an epoxy functional polythioether and a polyamine.

2. The coating composition of claim 1, wherein the isocyanate functional compound comprises a polythiourethane reaction product of a thiol-functional polythioether and an isocyanate functional compound.

3. The coating composition of claim 1, wherein the isocyanate functional compound comprises a polythioether-polyurethane reaction product of a hydroxy-functional polythioether and an isocyanate functional compound.

4. A method for coating a substrate comprising:
   applying to at least a portion of the substrate the coating composition of claim 1.

5. A substrate coated at least in part with the coating of claim 1.

6. The substrate of claim 5, wherein the substrate comprises at least a portion of a vehicle.

7. The substrate of claim 6, wherein the substrate comprises a truck bed.

8. The substrate of claim 5, wherein the substrate comprises at least a portion of a building structure.

9. A coating composition comprising polyurea and polythiourea formed from a reaction mixture comprising:
   a first component comprising an isocyanate selected from one or more of isophorone diisocyanate (IPDI), cyclohexylene diisocyanate, 4,4'-methylenedicyclohexyl diisocyanate ($H_{12}$MDI), tetramethylxylyl diisocyanate, OCN—C(CH$_3$)$_2$—C$_6$H$_4$C(CH$_3$)$_2$—NCO, 1,4-tetramethylene diisocyanate, 1,5-pentamethylene diisocyanate, 1,6-hexamethylene diisocyanate (HMDI), 1,7-heptamethylene diisocyanate, 2,2,4-trimethylhexamethylene diisocyanate, 2,4,4-trimethylhexamethylene diisocyanate, 1,10-decamethylene diisocyanate, 2-methyl-1,5-pentamethylene diisocyanate, phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate, alkylated benzene diisocyanates, methylenediphenyl diisocyanate, 3,3'-dimethyl-4,4'-diphenylmethane diisocyanate, the uretdione of 1,6-hexamethylene diisocyanate, the biuret of 1,6-hexanediisocyanate, the isocyanurate of 1,6-hexanediisocyanate, and the isocyanurate of isophorone diisocyanate; wherein at least 1 percent by weight of the first component comprises at least one polyisocyanate monomer; and
   a second component comprising an amine and an amine/hydroxy functional polythioether different from the amine, wherein the amine/hydroxy functional polythioether comprises an amine-functional reaction product of an epoxy functional polythioether and a polyamine.

10. The coating composition of claim 9, wherein the first component and the second component can be applied to a substrate at a volume mixing ratio of 1:1.

11. A method for coating a substrate comprising:
  applying to at least a portion of the substrate the coating composition of claim 9.

12. A substrate coated at least in part with the coating of claim 9.

13. The substrate of claim 12, wherein the substrate comprises at least a portion of a vehicle.

14. The substrate of claim 13, wherein the substrate comprises a truck bed.

15. The substrate of claim 12, wherein the substrate comprises at least a portion of a building structure.

* * * * *